US012491166B2

(12) United States Patent
Mitra et al.

(10) Patent No.: US 12,491,166 B2
(45) Date of Patent: Dec. 9, 2025

(54) METHOD OF DELIVERING AN ACTIVE COMPOUND AND DELIVERY DEVICE FOR USE IN THE SAME

(71) Applicant: Wacker Chemie AG, Munich (DE)

(72) Inventors: Amitabha Mitra, Saline, MI (US); Megan Gutman, Fraser, MI (US); Megan Zarembski, Ann Arbor, MI (US); Johanna Koch, Munich (DE); Ryan Hollingsworth, Canton, MI (US)

(*) Notice: Subject to any disclaimer, the term of this patent is extended or adjusted under 35 U.S.C. 154(b) by 173 days.

(21) Appl. No.: 17/460,820

(22) Filed: Aug. 30, 2021

(65) Prior Publication Data
US 2022/0062193 A1    Mar. 3, 2022

Related U.S. Application Data

(60) Provisional application No. 63/072,940, filed on Aug. 31, 2020.

(51) Int. Cl.
A61K 9/70 (2006.01)
A61K 31/00 (2006.01)

(52) U.S. Cl.
CPC .......... A61K 9/7069 (2013.01); A61K 31/658 (2023.05)

(58) Field of Classification Search
None
See application file for complete search history.

(56) References Cited

U.S. PATENT DOCUMENTS

| | | | |
|---|---|---|---|
| 4,584,355 A | 4/1986 | Blizzard et al. | |
| 4,585,836 A | 4/1986 | Homan et al. | |
| 4,591,622 A | 5/1986 | Blizzard et al. | |
| 4,655,767 A | 4/1987 | Woodard et al. | |
| 4,994,267 A | 2/1991 | Sablotsky | |
| 5,016,652 A | 5/1991 | Rose et al. | |
| 5,232,702 A | 8/1993 | Pfister et al. | |
| 5,366,809 A * | 11/1994 | Schmidt | C09J 183/04 428/452 |
| 5,446,070 A | 8/1995 | Mantelle | |
| 5,474,783 A | 12/1995 | Miranda et al. | |
| 5,503,844 A | 4/1996 | Kwiatek et al. | |
| 5,656,286 A | 8/1997 | Miranda et al. | |
| 6,113,940 A | 9/2000 | Brooke et al. | |
| 6,132,762 A | 10/2000 | Cristobal | |
| 6,328,992 B1 | 12/2001 | Brooke et al. | |
| 6,562,363 B1 | 5/2003 | Mantelle et al. | |
| 7,437,189 B2 | 10/2008 | Matsumura et al. | |
| 8,246,976 B2 | 8/2012 | Nguyen | |
| 8,435,556 B2 | 5/2013 | Stinchcomb et al. | |
| 8,449,908 B2 | 5/2013 | Stinchcomb et al. | |
| 8,652,511 B2 | 2/2014 | Cottrell et al. | |

(Continued)

FOREIGN PATENT DOCUMENTS

| | | |
|---|---|---|
| IN | 300882 B | 9/2018 |
| WO | 2014043158 A1 | 3/2014 |
| WO | 2018125037 A1 | 7/2018 |

Primary Examiner — Isis A Ghali

(57) ABSTRACT

A method of delivering an active compound includes providing a delivery device having a first portion. The first portion defines a first outer surface of the device. An active compound is provided in the first portion. The first outer surface exhibits a first tack after providing the active compound and a second tack of at least 25 percent the first tack after delivering the active compound to the first outer surface.

8 Claims, 9 Drawing Sheets

(56) References Cited

U.S. PATENT DOCUMENTS

| | | |
|---|---|---|
| 8,707,962 B2 | 4/2014 | Dominguez et al. |
| 9,375,417 B2 | 6/2016 | Smith et al. |
| 10,265,511 B2 | 4/2019 | McAllister et al. |
| 10,272,125 B2 | 4/2019 | Weimann |
| 10,292,942 B2 | 5/2019 | Horstmann et al. |
| 2008/0044460 A1 | 2/2008 | Millet et al. |
| 2012/0135225 A1* | 5/2012 | Colas .................. A61K 9/7084 428/354 |
| 2014/0276479 A1 | 9/2014 | Nguyen et al. |
| 2016/0317699 A1 | 11/2016 | Dicosmo |
| 2017/0157284 A1 | 6/2017 | Pearce et al. |
| 2018/0140513 A1 | 5/2018 | Jones |
| 2018/0221297 A1 | 8/2018 | Valia |
| 2019/0133994 A1 | 5/2019 | Smith et al. |
| 2019/0247453 A1 | 8/2019 | Weimann |
| 2021/0196934 A1 | 7/2021 | Butterworth |

\* cited by examiner

METHOD OF DELIVERING AN ACTIVE COMPOUND AND DELIVERY DEVICE FOR USE IN THE SAME

CROSS-REFERENCE TO RELATED APPLICATION

This application claims the benefit of U.S. provisional application Ser. No. 63/072,940, filed Aug. 31, 2020, the contents of which is hereby incorporated by reference in their entirety.

BACKGROUND

The invention relates in general to a method of delivering an active compound. The invention also relates to a delivery device for use in delivering the active compound.

Active compounds such as, for example, pharmacologically active compounds are believed to offer a variety of benefits. However, the known systems and methods for delivering active compounds transdermally or topically are complex and expensive. Furthermore, the systems known in the art fail to release the active compound in a controlled manner, which results in delivering an amount of active that is not effective or a system that does not provide a sustained benefit. Additionally, the known methods and systems used therein are only suitable for a single use.

Therefore, it would be desirable to provide a method of delivering an active compound and a delivery device that overcomes the aforementioned deficiencies.

BRIEF SUMMARY

In an embodiment, a method of delivering an active compound is provided. In this embodiment, the method comprises providing a delivery device having a first portion. The first portion defines a first outer surface of the device. An active compound is provided in the first portion. The first outer surface exhibits a first tack after providing the active compound and a second tack of at least 25 percent of the first tack after delivering the active compound to the first outer surface.

In another embodiment, a method of delivering a pharmacologically active compound is provided. In this embodiment, the method comprises providing a delivery device having a first portion. The first portion defines a first outer surface of the device.

In this embodiment, the pharmacologically active compound is a cannabinoid. The cannabinoid is provided in the first portion. The first outer surface exhibits a first tack after providing the cannabinoid and a second tack of at least 25 percent the first tack after delivering the cannabinoid to the first outer surface.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION

Figure 1:
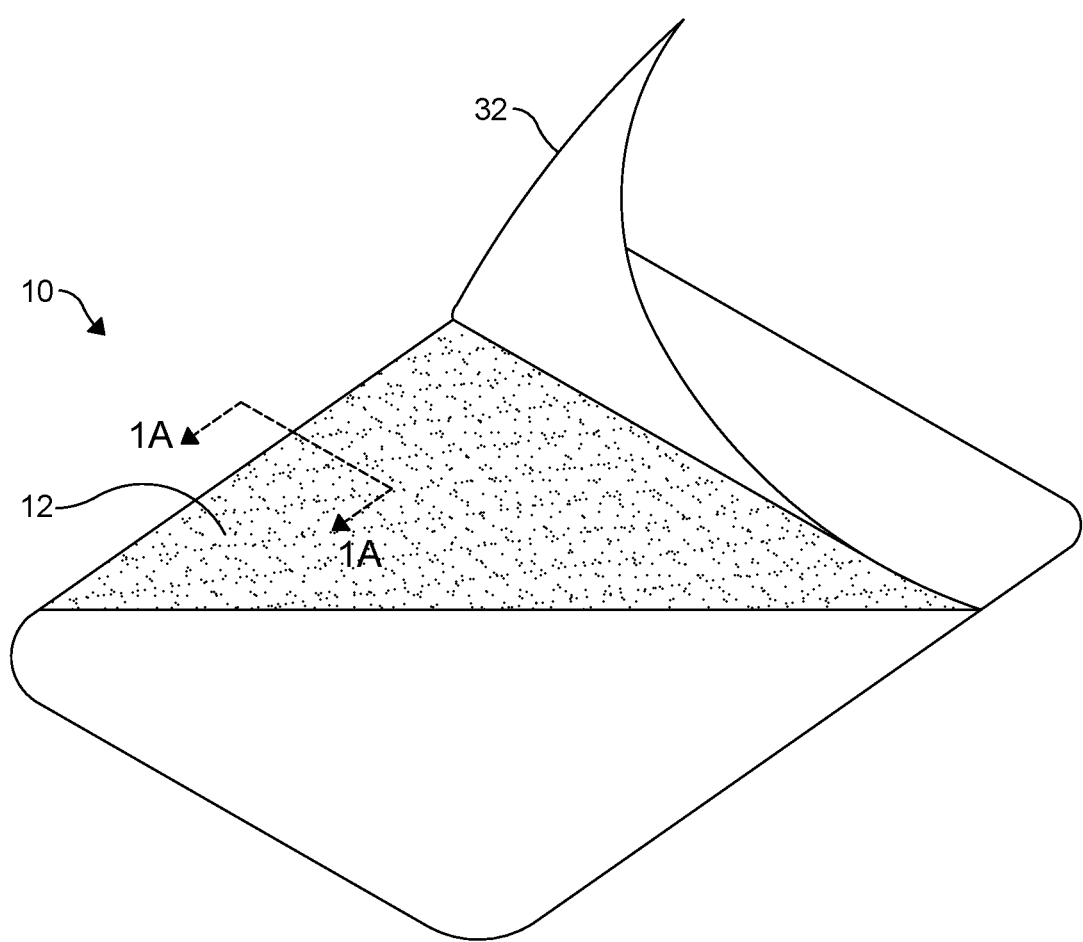
FIG. 1 is a perspective view of an embodiment of a delivery device in accordance with the invention.

It is to be understood that the invention may assume various alternative orientations and step sequences, except where expressly specified to the contrary. It is also to be understood that the specific materials, articles, and methods described in the following specification are simply exemplary embodiments of the inventive concepts. Hence, specific properties, conditions, or other physical characteristics relating to the embodiments disclosed are not to be considered as limiting, unless expressly stated otherwise.

In an embodiment, a method of delivering an active compound (hereinafter also referred to as the "method") is provided. Active compounds suitable for use in the method may be referred to herein simply as an "active" or "actives." The active compound (active) may be a pharmacologically active such as, for example, a cannabinoid and, in some embodiments, the method will be described primarily with respect to delivering a cannabinoid. The method may also be suitable for use in delivering other actives such as, for example, cosmetic, wound care, wellness, or performance enhancing actives. The actives suitable for delivery according to the method can be delivered topically or transdermally.

In addition to cannabinoids, pharmacologically actives suitable for use in the method include oxymorphone, caffeine, zidovudine, pilocarpine, ranitidine, lazabemide, thiopental, scopolamine, butabarbital, digoxin, tiapride, pemoline, diclofenac, antipyrine, albuterol, oxycodone, terbutaline, ephedrine, pseudoephedrine, morphine, captopril, mescaline, naloxone, phenelzine, secobarbital, flumazenil, fluvastatin; sumatriptan, oxcarbazepine, modafinil, moclobemide, nadolol, aldosterone, pentaerythritol, prazosin, ramipril, guanfacine, physostigmine, phenobarbital, minoxidil, aprobarbital, naltrexone, leflunomide, terazosin, pindolol, fludrocortisone, mephobarbital, profentofylline, methysergide, transylcypromine, prednisone, hydromorphone, dantrolene, hydrocortisone, talipexole, lidocaine, metoprolol, betamethasone, timolol, lesopitron, benzocaine, clobazam, colchicine, butalbital, prilocalne, atropine, mepivacaine, procaine, pentobarbital, amobarbital, clorazepate, yohimbine, temazepam, hydrocodone, phenyloin, trimethobenzamide, warfarin, carbamazepam, nedociomil, buspirone, ketorolac, oxazepam, piribedil, pramipexole, secobarbital, hydrocortisone, lorazepam, chlordiazepoxide, quetiapine, enalapril, betamethasone acetate, tamsulosin, nifedipine, ergotamine, clonazepam, atorvastatin, tolmetin, bumetanide, piroxicam, perindopril, propranolol, mexiletene, chlorzoxazone, indapamide, diazepam, ciciopirox, ramipril, amphetamine, benztropine, methylphenidate, apomorphine, diltiazem, alprenolol, clozapine, ropivacaine, valproic acid, norethindrone, ketoprofen, tramadol, tetracaine, etorphine, flurazepam, meperidine, ropinirole, carvedilol, bupranolol, pravastatin, naproxen, diphenhydramine, ketamine, albendazole, idebenone, tacrine, finasteride, nabumetone, gestodene, testosterone, venlafaxine, estazolam, rimantadine, phentolamine, propafenone, levorphanol, bupivicaine, perindopril, droperidol, celecoxib, norgestrel, isradipine, risperidone, benazepril, loratidine, betamethasone, progesterone, butorphanol, papaverine, quinapril, alprostadil, prostaglandin, citalopram, ibuprofen, flurbiprofen, chlorpheniramine, zolpidem, alprazolam, fentanyl, nisoldipine, benztropine, betamethasone, etodolac, tibolone, estradiol, adamantane, chlormadinine, oxybutynin, triazolam, doxepin, prazepam, capsaicin, granisetron, frovatriptan and norethindrone acetate.

Other actives suitable for use in practicing the method include antioxidants, free radical scavengers, moisturizers, depigmentation agents, reflectants, humectants, antimicrobial (e. g., antibacterial) agents, allergy inhibitors, anti-acne agents, anti-aging agents, anti-wrinkling agents, antiseptics, analgesics, antitussives, antipruritics, local anesthetics, anti-hair loss agents, hair growth promoting agents, hair growth inhibitor agents, antihistamines, keratolytic agents, anti-inflammatory agents, fresheners, healing agents, anti infectives, inflammation inhibitors, anticholinergics, vasoconstrictors, vasodilators, wound healing promoters, peptides, polypeptides and proteins, deodorants and antiperspirants, skin emollients and skin moisturizers, hair conditioners, hair softeners, hair moisturizers, tanning agents, skin lightening agents, antifungals such as antifungals for foot preparations, depilating agents, external analgesics, counterirritants, hemorrhoidals, insecticides, poison ivy products, poison oak products, burn products, anti-diaper rash agents, prickly heat agents, make-up preparations, vitamins, amino acids and their derivatives, herbal extracts, retinoids, flavoids, sensory markers (e.g. cooling agents, heating agents, etc.), skin conditioners, hair lighteners, chelating agents, cell turnover enhancers, coloring agents, sunscreens, anesthetics, immunomodulators and nourishing agents, moisture absorbers, sebum absorbers and the like, and mixtures thereof. Local anaesthetics, local antibiotics, antiseptics, antimycotics, antihistaminics, and antipruritic drugs, keratolytics and caustic drugs, virustatics, antiscabietic agents, steroids, as well as different substances for the treatment of acne, psoriasis, photodermatoses, or precancerous stages can be used in the method for the dermal treatment.

In certain embodiments, actives which are directed intradermally can be utilized according to the method. Actives applicable by way of the intradermal route include, for example, steroid and nonsteroid antirheumatics, local anaesthetics, substances stimulating the blood flow, vasoprotectors and vasoconstrictors to treat vascular diseases, as well as active substances to influence processes in the subcutaneous fatty tissue.

Additional actives suitable for use in practicing the method include, for example, analgesics, anti-arrhrythmic drugs, narcotics and their antagonists, neuroleptics, hormones or hormone substitutes, antidepressants, tranquilizers, hypnotics, psychostimulants, antiparkinson drugs, ganglionic blockers, sympathomimetics, alpha-sympatholytics, beta-sympatholytics, antisympathotonics, antiasthmatics, antiemetics, appetite depressants, diuretics, or active substances for weight reduction, and the like.

In some embodiments, suitable actives are capable of providing an effect at very low concentrations. Examples of these actives suitable for use in practicing the method include steroids, such as estradiol, estriol, progesterone, norethisterone, norethindrone, levonorgestrel and their derivatives, as well as estradiol diacetate, norgestamate, gestagens, desogestrel, dern egestrone, pro megestrone, testosterone, hydrocortisones and their derivatives, nitro compounds, such as amyl nitrate, nitroglycerin, isosorbide dinitrate, amine compounds, such as nicotine, chlorpheniramine, terfenadine, and triprolidine, oxicam derivatives such as piroxicam, mucopolysaccharases such as thiomucase, opioid substances such as buprenorphine, morphine, fentanyl and their salts, derivatives or analogues, naloxone, codeine, dihydroergotamine, lysergic acid derivatives, pizotiline, salbutamol, terbutaline, prostaglandins, such as PGA, PGB, PGE and the PGF series, for example, misoprostol and enprostil, omeprazol, imipramine, benzamides, such as metoclopramines and scopolamine, peptides and growth factors such as EGF, TGF, PDGF, and the like, somatostatin, clonidine, dihydropyridines, such as nifedipine, nitrendipine, verapamil, diltiazem, ephedrine, propanolol, metoprolol, spironolactone, thiazides such as hydrochlorothiazide and flunarizine. Styptic or wound-cleansing actives such as enzymes, antiseptics, disinfectants, and antibiotics, pain relieving agents and anaesthetic actives, as well as active substances promoting wound healing to stimulate granulation, to induce vascularization, or to promote epithelization can be used in the method.

In some embodiments, the active could be a steroid hormone, preferably estradiol either alone or combined with other actives.

The method can also include the use of actives derived from vegetable preparations, such as extracts or tinctures for the treatment of topical skin diseases. Suitable extracts or tinctures include oak bark extract, walnut extract, tincture of *arnica, hamamelis* extract, ribwort extract, pansy extract, thyme or sage extract, St. John's wort tincture, cone flowers tincture, chamomile flowers extract, or calendula flowers tincture, birch leaves extract, nettle extract, coldsfoot extract, comfrey tincture, horsetail extract, or aloe vera extract. Additional actives for the intradermal treatment of diseases suitable for use include, for example, extracts of horse chestnut and butcher's broom in case of vein diseases, or extracts and tinctures of *arnica*, calendula, and *capsicum* in case of contusions, distortions, or haemorrhages. Suitable actives from vegetable preparations according to the method may also be used in transdermal therapy, for example, *ginseng* extract, valerian tincture, extracts of melissa and hop, extracts of kola and tea; or hawthorn extract.

Suitable effervescent actives can be added to the delivery device, including sodium bicarbonate and sodium carbonate. Suitable amino acid actives can be added to the delivery device, including amino acids derived from the hydrolysis of various proteins as well as the salts, esters, and acyl derivatives thereof. Examples of such amino acid agents include amphoteric amino acids such as alkylamido alkylamines, stearyl acetyl glutamate, capryloyl silk amino acid, capryloyl collagen amino acids, capryloyl kertain amino acids, capryloyl pea amino acids, cocodimonium hydroxypropyl silk amino acids, corn gluten amino acids, cysteine, glutamic acid, glycine, hair keratin amino acids, hair amino acids such as aspartic acid, threonine, serine, glutamic acid, proline, glycine, alanine, half-cystine, valine, methionine, isoleucine, leucine, tyrosine, phenylalanine, cysteic acid, lysine, histidine, arginine, cysteine, tryptophan, citrulline, lysine, silk amino acids, wheat amino acids, and mixtures thereof.

Suitable peptides, polypeptides, and proteins can be utilized as actives in the method, including those polymers that have a long chain, such as at least about 10 carbon atoms, and a high molecular weight, such as at least about 1000, and are formed by self-condensation of amino acids. Examples of such proteins include collagen, deoxyribonuclease, iodized corn protein, keratin, milk protein, protease, serum protein, silk, sweet almond protein, wheat germ protein, wheat protein, wheat protein, alpha and beta helix of keratin proteins, hair proteins, such as intermediate filament proteins, high-sulfur proteins, ultrahigh-sulfur proteins, intermediate filament-associated proteins, high-tyrosine proteins, high-glycine tyrosine proteins, tricohyalin, and mixtures thereof.

Vitamins can be utilized as actives in the method. Examples of suitable vitamins that can be used include vitamin B complex, including thiamine, nicotinic acid, biotin, pantothenic acid, choline, riboflavin, vitamin B6, vitamin B12, pyridoxine, inositol, carnitine; vitamins A, C, D, E, K and their derivatives such as vitamin A palmitate and provitamins, such as panthenol (pro vitamin B5) and panthenol triacetate, and mixtures thereof.

Antibacterial agents can be utilized as actives in the method. Examples of suitable antibacterial agents that can be used in the method include bacitracin, erythromycin, neomycin, tetracycline, chlortetracycline, benzethonium chloride, phenol, and mixtures thereof.

Skin emollients and skin moisturizers can be utilized as actives in the method. Examples of suitable skin emollients and skin moisturizers that can be used include mineral oil, lanolin, vegetable oils, isostearyl isostearate, glyceryl laurate, methyl gluceth 10, methyl gluceth 20 chitosan, and mixtures thereof.

Hair conditioners can be utilized as actives in the method. Examples of suitable hair conditioner actives include quaternized compounds such as behenamidopropyl PG-dimonium chloride, tricetylammonium chloride, dehydrogenated tallowamidoethyl hydroxyethylmonium methosulfate, and mixtures thereof as well as lipophilic compounds like cetyl alcohol, stearyl alcohol, hydrogenated polydecene, and mixtures thereof.

Sunscreen agents can be utilized as actives in the method. Examples of sunscreen agents that can be used as actives in the method include butyl methoxydibenzoylmethane, octyl methoxycinnamate, oxybenzone, octocrylene, octyl salicylate, phenylbenzimidazole sulfonic acid, ethyl hydroxypropyl aminobenzoate, menthyl anthranilate, aminobenzoic acid, cinoxate, diethanolamine methoxycinnamate, glyceryl aminobenzoate, titanium dioxide, zinc oxide, oxybenzone, padimate o, red petrolatum, and mixtures thereof.

Tanning agents and skin lightening agents can be utilized as actives in the method. An example of a suitable tanning agent that can be utilized as an active is dihydroxyacetone. Examples of suitable skin lightening agents that can be used include hydroquinone, catechol and its derivatives, ascorbic acid and its derivatives, and mixtures thereof.

Insecticides can be utilized as actives in the method. Examples of suitable insecticides include permethrin, pyrethrin, piperonyl butoxide, imidacloprid, N, N-diethyl toluamide, which refers to the material containing predominantly the meta isomer.

Anti-fungals for foot preparations that can be used as actives in the method. An example of a suitable active with anti-fungal properties is tolnaftate.

Depilating agents can be utilized as actives in the method. Examples of suitable depilating agents include calcium thioglycolate, magnesium thioglycolate, potassium thioglycolate, strontium thioglycolate, and mixtures thereof.

Analgesics and local anesthetics can be utilized as actives in the method. Examples of suitable external analgesics and local anesthetics that can be used include benzocaine, dibucaine, benzyl alcohol, camphor, capsaicin, *capsicum, capsicum* oleoresin, juniper tar, menthol, methyl nicotinate, methyl salicylate, phenol, resorcinol, turpentine oil, and mixtures thereof.

Antiperspirants and deodorants that can be used as actives in the method. Examples of suitable antiperspirants and deodorants that can be used as actives in the method include aluminium chlorohydrates, aluminium zirconium chlorohydrates, and mixtures thereof.

In some embodiments, the active may be a counterirritant. Examples of suitable counterirritants that can be used in the method include camphor, menthol, methyl salicylate, peppermint and clove oils, ichtammol, and mixtures thereof.

In some embodiments, the active may be an inflammation inhibitor such as, for example, hydrocortisone. In other embodiments, the active may be a hemorrhoidal product. Examples of suitable hemorrhoidal products include anesthetics such as benzocaine, pramoxine hydrochloride, and mixtures thereof; antiseptics such as benzethonium chloride; astringents such as zinc oxide, bismuth subgallate, balsam Peru, and mixtures thereof; skin protectants such as cod liver oil, vegetable oil, and mixtures thereof.

Benefit agents are also suitable for use as actives. Suitable benefit agents include therapeutic agents that are effective in the treatment of dandruff, seborrheic dermatitis, and psoriasis as well as the symptoms associated therewith. Examples of such suitable therapeutic agents include zinc pyrithione, shale oil and derivatives thereof such as sulfonated shale oil, selenium sulfide, sulfur; salicylic acid; coal tar; povidone-iodine and imidazoles.

In some embodiments, the active may be an antimicrobial, an antiseptic, or a keratolytic agent. Antimicrobials that can be utilized for topical application are penicillins, cephalosporins, other beta-lactam compounds, aminoglycosides, tetracyclines, erythromycin, antifungal agents, and the like and a combination thereof. Antiseptics that can be utilized as actives for topical application onto acneiform skin are triclosan (Irgasan DP 300), phenoxy isopropanol, resorcinol, chlorhexidine, povidone and iodine. Keratolytic agents that can be utilized for topical application onto acneiform skin are salicylic acid, benzoyl peroxide, sulphur, retinoic acid and any of a number of fruit acids and alpha hydoxy acids.

In other embodiments, the active may be an anti-irritant. Suitable anti-irritants for the topical application onto acneiform skin are alpha-bisabolol, famesol, chamomile extract and glycyrrhetinic acid.

In some embodiments, the active may be an anti-inflammatory analgesic agent. Examples of anti-inflammatory analgesic agents suitable for use in the method include acetaminophen, methyl salicylate, monoglycol salicylate, aspirin, mefenamic acid, flufenamic acid, indomethacin, diclofenac, alclofenac, diclofenac sodium, ibuprofen, ketoprofen, naproxen, pranoprofen, fenoprofen, sulindac, fenclofenac, clidanac, flurbiprofen, fentiazac, bufexarnac, piroxicam, phenylbutazone, oxyphenbutazone, clofezone, pentazocine, mepirizole, tiaramide hydrochloride, and the like.

In certain embodiments, the active may be a steroidal anti-inflammatory agent. Examples of steroidal anti-inflammatory agents that can be used in the method include hydrocortisone, predonisolone, dexamethasone, triamcinolone acetonide, fluocinolone acetonide, hydrocortisone acetate, predonisolone acetate, methylpredonisolone, dexamethasone acetate, betamethasone, betamethasone valerate, flumetasone, fluorometholone, beclomethasone diproprionate, and the like.

Antihistamines are also suitable for use as actives in the method. Examples of antihistamines include diphenhydramine hydrochloride, diphenhydramine salicylate, diphenhydramine, chlorpheniramine hydrochloride, chlorpheniramine maleate isothipendyl hydrochloride, tripelennamine hydrochloride, promethazine hydrochloride, methdilazine hydrochloride, and the like.

In certain embodiments, the active may be a local anesthetics including, for example, dibucaine hydrochloride, dibucaine, lidocaine hydrochloride, lidocaine, benzocaine, p-buthylaminobenzoic acid 2-(die-ethylamino) ethyl ester hydrochloride, procaine hydrochloride, tetracaine, tetracaine hydrochloride, chloroprocaine hydrochloride, oxyprocaine hydrochloride, mepivacaine, cocaine hydrochloride, piperocaine hydrochloride, dyclonine, dyclonine hydrochloride, and the like.

In other embodiments, the active may be a bactericide or a disinfectant. Bactericides and disinfectants that can be utilized include thimerosal, phenol, thymol, benzalkonium chloride, benzethonium chloride, chlorhexidine, povidone iode, cetylpyridinium chloride, eugenol, trimethylammonium bromide, and the like.

In other embodiments, the active may be a vasoconstrictor, hemostatic, chemotherapeutic drug, or an antibiotic. Examples of vasoconstrictors suitable for use include naphazoline nitrate, tetrahydrozoline hydrochloride, oxymetazoline hydrochloride, phenylephrine hydrochloride, tramazoline hydrochloride, and the like. Examples of hemostatics suitable for use include thrombin, phytonadione, protamine sulfate, aminocaproic acid, tranexamic acid, carbazochrome, carbaxochrome sodium sulfanate, rutin, hesperidin, and the like. Examples of chemotherapeutic drugs that can be used include sulfamine, sulfathiazole, sulfadiazine, homosulfamine, sulfisoxazole, sulfisomidine, sulfamethizole, nitrofurazone, and the like. Examples of antibiotics include penicillin, meticillin, oxacillin, cefalotin, cefalordin, erythromcycin, lincomycin, tetracycline, chlortetracycline, oxytetracycline, metacycline, chloramphenicol, kanamycin, streptomycin, gentamicin, bacitracin, cycloserine, and the like.

Suitable actives include antiviral drugs such as protease inhibitors, thymadine kinase inhibitors, sugar or glycoprotein synthesis inhibitors, structural protein synthesis inhibitors, attachment and adsorption inhibitors, and nucleoside analogues such as acyclovir, penciclovir, valacyclovir, and ganciclovir.

Further suitable actives include alpha-hydroxy acids (AHAs) which can be used as exfoliants, moisturizers, and emollients, lactic acid salts such as sodium lactate, and salicylic acid can be used in method as peeling agents. The moisturizing activity of AHAs and their ability to exfoliate the skin and interfere with intercellular cohesion in the outer epidermis is well known. It has been suggested that AHAs interfere with cohesion in the stratum *granulosum*, unlike salicylic acid and other exfoliants.

In certain embodiments, actives which have an effect on the skin can be delivered according to the method. Such actives may be of the cosmetic variety such as, for example, melatonin or niacinamide. Another suitable skin effecting active is vitamin C (ascorbic acid) can be used in practicing the method. In some embodiments, vitamin C may be provided in a mixture including vitamin E and other ingredients, such as moisturizers, collagen synthesis promoting agents and exfoliating agents. In other embodiments, vitamin C may be provided with vitamin E, and optionally, alpha-hydroxy acids, such as lactic and glycolic acids and other keratinolytics for the treatment or prevention of wrinkles and skin dryness.

Further examples of actives of the cosmetic variety include D-alphatocopherol, DL-alpha-tocopherol, D-alpha-tocopheryl acetate, DL-alpha-tocopheryl acetate, ascorbyl palmitate, vitamin F and vitamin F glycerides, vitamin D, retinol, retinol esters, retinyl palmitate, retinyl propionate, beta-carotene, D-panthenol, famesol, farnesyl acetate, jojoba oils and blackcurrant oils rich in essential fatty acids, 5-n-octanoylsalicylic acid and esters thereof, salicylic acid and esters thereof, alkyl esters of alpha-hydroxy acids such as citric acid, lactic acid, glycolic acid, asiatic acid, madecassic acid, asiaticoside, total extract of *Centella asiatica*, beta-glycyrrhetinic acid, alpha-bisabolol, ceramides such as 2-oleoylamino-1, 3-octadecane; phytanetriol, phospholipids of marine origin which are rich in polyunsaturated essential fatty acids, ethoxyquine, extract of rosemary, extract of balm, quercetin, extract of dried microalgae, anti-inflammatory agents, such as steroidal anti-inflammatory agents, and biostimulants, for example hormones or compounds for the synthesis of lipids and/or proteins.

Other examples of actives suitable for use in the method include vitamin D3, iron in any form, zinc in any form (such as zinc citrate), folic acid, melatonin, niacinamide, green tea or extract, *ginseng, arnica*, turmeric, curcumin, cannabinoids, tea tree oil, clortrimazole, hyaluronic acid, alpha hydroxy acids, resveratrol, argan oil, and CoQ10.

In some embodiments, the active can be delivered in its free base or acid form, or in the form of salts, esters, or any other acceptable derivative, or as a component of a molecular complex. It should be appreciated that even when not specifically mentioned, the actives described above could also be delivered as a mixture of actives.

As noted above, in some embodiments, the pharmacologically active is a cannabinoid. Cannabinoids may be desired because of their therapeutic applications. In some applications, the cannabinoid may be utilized in managing pain and muscle spasms. However, the applications for cannabinoids are not limited to pain management and muscular movement. For example, the cannabinoid may be utilized in treating other health issues such as, for example, nausea or vomiting. In other applications, the cannabinoid may have anti-inflammatory, anti-psychotic, or anti-oxidant effects.

As used herein, the term "cannabinoid" may refer to a chemical compound that acts on cannabinoid receptors on human cells, any ligand of a cannabinoid receptor, or cannabinols and the other active compounds of *cannabis* plants such as, for example, *Cannabis sativa* and *Cannabis indica*. An example of cannabinol compounds suitable for use in practicing the method are tetrahydrocannabinols such as, for example, tetrahydrocannabinol (THC) and similar compounds. An example of another cannabinoid compound suitable for use in practicing the method is cannabidiol (CBD). The structure of CBD is shown below.

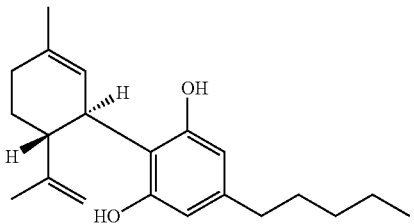 [SMILES: C=C(C)[C@@H]1CCC(C)=C[C@H]1c1c(O)cc(CCCCC)cc1O]

Other cannabinoids suitable for use in practicing the method include tetrahydrocannabinolic acid (THC-a), tetrahydrocannabivarin (THC-v), cannabinol (CBN), and cannabichromene (CBC), cannabigerol (CBG), and cannabidivarin (CBDV).

The method may be practiced by delivering, for example, a cannabinoid mentioned above or a mixture thereof. Base, acid, salt, ester, and derivative forms of THC, CBD, and other cannabinoids are suitable for use in practicing the method. In some embodiments, the cannabinoid may be provided as a component of a molecular complex or in another manner.

The active compound can be provided in various forms. For example, in certain embodiments, the active compound can be provided in liquid form. In one such embodiment, the active compound may be provided as an oil. When the active compound is a cannabinoid, the oil may be an extract from a *cannabis* plant. The oil can be diluted with a liquid carrier. The active compound may also be provided in liquid form by dissolving or dispersing a solid form of the active compound in a liquid carrier. In other embodiments, the active compound can be provided in a solid form. For example, when the active compound is a cannabinoid, the cannabinoid may be provided as CBD isolate. In still other embodiments, the active compound can be provided in a paste or a gel.

As noted above, the active compound can be provided in a liquid carrier. A carrier can also include one or more agents that are included to enhance the delivery of the active compound. In some embodiments, the carrier can also include one or more agents known to accelerate or in another manner enhance the delivery of the active compound through the skin. For example, an agent may be provided to increase the permeability of the skin with respect to the active compound. Suitable agents include those that improve the solubility and diffusibility of the active compound and those that improve percutaneous absorption, for example, by changing the ability of the stratum corneum to retain moisture, softening the skin, improving the skin's permeability, acting as penetration assistants or hair-follicle openers or changing the state of the skin including the boundary layer.

Suitable agents may have more than one mechanism of enhancing the delivery of active compound. When the agent is not provided in the carrier, the agent can be administered to the skin of a user as a precedent step to the application of the active compound.

Examples of suitable agents include polar materials capable of forming strong hydrogen bonds, such as urea, which polarize the user's skin molecules and increase the skin's permeability through ionic force. Another suitable polar agent, which is suitable for use in the method is a solution of DMSO (dimethylsulfoxide). Other examples of suitable agents include nonionic surfactants or solvents having an hydrophile lipophile balance (HLB) value from about 6-30. As used herein, the term "HLB" refers to a numeric expression of the ability to emulsify non-soluble ingredients in oil and water. These agents may be selected from chemical groups of glycerol esters, polyglycerol esters, alkyl fatty acid esters, ethoxylated sorbitan esters, alcohol ethoxylates, lanolin ethoxylates, ethoxylated fatty methyl esters and alkanolamides. Preferably, in these embodiments, the agent has an HLB value from about 8-28. Examples of suitable agents having an HLB value of 8-10 include PEG 200 monolaurate, sorbitan monolaurate, POE myristylether, POE lauryl alcohol, POE lauryl ether, POE sorbitan monooleate, octyphenoxypoly (ethyleneoxy) ethanol, linear alcohol ethoxylate, mono and diglycerides with polysorbate 80, nonyl phenol ethoxylate, alkylaryl polyether ethanol, N, N-dimethyl amide. Examples of agents having an HLB value from 11-14 include PEG 400 monooleate, polyoxyaryl ether, POE oleyl alcohol, PEG 600 monooleate, POE sorbitan monooleate, PEG 400 monolaurate, POG laurylalcohol and nonylphenoxypoly (ethyleneoxy) ethanol. Examples of agents having an HLB value from 15-28 include nonyl phenol ethoxylate, castor oil ethoxylate, ethoxylated cocomonoglyceride, oleylalcohol condensed with ethylene oxide, modified oxyethylated straight chain alcohol, ethoxylated lanolin alcohol, nonylphenyl ethoxylate, polyethylene 100 stearyl ether, PEG 6000 monooleate, ethoxylated polyoxypropylene glycols and ethoxylated polyoxypropylene glycols. Preferably, the agent is provided in an amount of about 1-50 weight percent, based on the total weight of the liquid composition.

The method comprises providing a delivery device 10. The delivery device 10 can be marked with colors, letters, numbers, dates, codes, pictographs and the like by means of screen printing. In some embodiments, one or more portions of the delivery device 10 can be dyed by, for example, using soluble dyes or pigments. Alternatively, the delivery device 10 can be completely transparent or invisible on the skin of a user.

Embodiments of the delivery devices suitable for practicing the method are illustrated in FIGS. 1-6. The delivery device 10 is utilized to deliver an active compound or a mixture of active compounds to a user. In some embodiments, the active compound is delivered to the skin and then the bloodstream of a user. In other embodiments, the active compound is provided for topical applications and does not enter the bloodstream of the user. In certain embodiments, the method enables a daily amount of an active compound to be administered to a user. For example, in the case of transdermal delivery of a cannabinoid, the daily amount of cannabinoid administered through the skin of a user in range a from about 0.25 to 50 micrograms per hour can be administered.

Utilizing the delivery device 10 allows for the rate of the active compound delivered to be controlled. For example, in some embodiments, the rate at which cannabinoid can be delivered to the skin of the user may be in a range from about 0.1 to 20 micrograms per square centimeter (cm$^2$) per hour (hr). Another advantage of the delivery device 10 described herein is that it can be used multiple times or is reusable. Therefore, the delivery device 10 may reduce the cost associated with manufacturing such devices and the use of a particular active compound. When the delivery device 10 is reused, the environmental footprint of using the particular active compound is also reduced.

The active compound is provided to and received by the delivery device 10. In some embodiments, the active compound is provided to the delivery device 10 before the device 10 is utilized. In these embodiments, the active compound may be provided to the delivery device 10 before the device 10 is applied to the skin of the user. In other embodiments, active compound may be provided to the delivery device 10 after the device 10 is applied to the user or while the device 10 is in direct contact with an area of interest or the user's skin.

As noted above, in some embodiments, the delivery device 10 may be reusable. In these embodiments, the delivery device 10 may be configured to receive one or more amounts of an active compound such as a cannabinoid. In embodiments where the delivery device 10 is configured to receive one or more amounts of an active compound, a first amount of active compound may be provided to the delivery device 10 and, for example, a second amount of active compound may be provided to the delivery device 10. In these embodiments, the first amount of active compound may be greater than, less than, or equal to the second amount of active compound. Additionally, the first amount of active compound may be of a composition that is the same as or different than the composition of the second amount of active compound. Further, additional amounts of active compound can be provided to the delivery device 10. The composition of the additional amounts of active compound may be the same as or different than the composition of the first amount, second amount, or another amount of active compound.

Referring back to the FIGS. 1-6, the delivery device 10 has a first portion 12. The composition and configuration of the first portion 12 may be utilized to control the rate by which the active compound is delivered to the bloodstream or another portion of the user. For example, the thickness of the first portion 12, which can vary between embodiments of the method, can be utilized to control the rate by which the active compound is delivered to the user. In some embodiments, the thickness of the first portion is selected to provide a desired rate of delivery of the active compound and a predetermined tack.

In some embodiments, the first portion 12 is formed in a unitary manner. The first portion 12 defines a first outer surface 14 of the device 10. When the delivery device 10 is in use, the first outer surface 14 is in contact with the skin or another portion of the user.

The first outer surface 14 may be of a desired shape and surface area. The surface area of the first outer surface 14 can vary between embodiments. In certain embodiments, the surface area of the first outer surface 14 may be 5 cm$^2$ or more. In other embodiments, the surface area of the first outer surface 14 may be 100 cm$^2$ or less. In these embodiments, the surface area of the first outer surface 14 may be 5-100 cm$^2$. More preferably, the surface area of the first outer surface 14 may be 5-30 cm$^2$. The shape of the first outer surface 14 can also vary between embodiments. For example, the first portion 12 may have a square shape, a square shape with rounded corners, an oval shape, a rectangle shape, a rectangle shape with rounded corners, a circular shape, or be of another shape.

In certain embodiments, the active compound is provided in the first portion 12. An active compound can be provided in the first portion 12 when, for example, forming the first portion 12, during the manufacture of the delivery device 10, after using the device 10, when the device 10 is in contact with the user, and/or at another time. In some embodiments, the first portion 12 may be utilized to adhere the delivery device 10 to human skin. In order to adhere the device 10 to skin or another portion of the user and maintain the shape of the first outer surface 14, in some embodiments, the first portion 12 may be elastomeric.

The first portion 12 is utilized to deliver the active compound to the skin or another area of the user. Preferably, the first portion 12 is provided in a state that allows the first outer surface 14 to adhere to the user and an active compound to flow therethrough to the first outer surface 14. In one such embodiment, the first portion 12 may comprise a gel. Preferably, when the first portion 12 comprises a gel, the gel is cohesive, which means that when the delivery device 10 is removed from the user, the first portion 12 does not break apart and leave sections thereof on the user such as, for example, his or her skin. Furthermore, it is preferred that the first portion 12 is permanently secured to the delivery device 10. In these embodiments, the first portion 12 is attached to another portion of the delivery device 10 and configured so that these portions remain secured to each other before and after use of the device 10. In embodiments where the first portion 12 is a gel, the first portion 12 may exhibit a viscosity of 50-100,000 centipoise before the mixture is cured. In other embodiments where the first portion 12 is a gel, the first portion 12 may exhibit a penetration hardness of 25-500 $\frac{1}{10}$ mm measured according to DIN ISO 2137 using a hollow cone of 62.5 grams for 60 seconds after the mixture is cured for 60 minutes at 120° C.

In some embodiments, the gel is formed by curing a mixture of siloxanes at an ambient temperature. The time in which the mixture cures can be reduced by heating the mixture. In certain embodiments, the mixture can be heated to a temperature of 20-250° C. for curing. Preferably, the mixture is cured at a temperature in the range of about 40° C. to about 150° C. More preferably, the temperature for curing the mixture is in the range of 100-150° C. Other curing mechanisms such as, for example, moisture curing, peroxide curing, and radiation curing may be utilized to form the gel.

In embodiments where a gel is provided, it is preferred that the mixture comprises a first polysiloxane and a second polysiloxane. The first polysiloxane and the second polysiloxane can be provided in separate components and combined to form the mixture. For example, the first polysiloxane could be provided as part of a component A and the second polysiloxane could be provided as a component B or vice versa. Preferably, a hydrosilylation catalyst is also provided. The hydrosilyation catalyst can be provided as a part of component A or component B. However, it may be preferred that the hydrosilylation catalyst is only provided in component A or component B. In some embodiments, the hydrosilylation catalyst may comprise a platinum metal, a compound comprising platinum, or a complex comprising platinum. Preferably, when a compound comprising platinum is utilized, the compound is soluble in the polysiloxane. Suitable soluble platinum compounds may include, for example, platinum olefin complexes, platinum cyclopropane complexes, the reaction products of hexachloroplatinic acid with alcohols, ethers and aldehydes or mixtures thereof, the reaction product of hexachloroplatinic acid with methylvinylcyclotetrasiloxane in the presence of sodium bicarbonate in ethanolic solution. Complexes of platinum with vinyl siloxanes, such as, for example, sym-divinyltetramethyldisiloxane are particularly preferred. Further examples are platinum phosphite complexes, platinum phosphine complexes or alkylplatinum complexes. One preferred catalyst is divinyl tetramethyl disiloxane platinum complex diluted in vinyl terminated polysiloxane (approximately 1 wt % Pt in the hydrosilylation catalyst).

In some embodiments, the first polysiloxane is an alkenyl-substituted polysiloxane. Preferably, the alkenyl-substituted polysiloxane is a polydimethylsiloxane having silicon-bonded vinyl, allyl, or hexenyl groups. More preferably, the polydimethylsiloxane comprises one or more silicon-bonded vinyl (SiVi) groups. The second polysiloxane comprises silicon-bonded hydrogen atoms, which provide one or more SiH groups. The gel can be cured by reacting the first polysiloxane with the second polysiloxane in the presence of the hydrosilylation catalyst. In certain embodiments, the one or more SiH groups react with the one or more SiVi groups. In these embodiments, the ratio of SiVi:SiH groups may be 10:1 to 1:10. Preferably, the ratio of SiVi:SiH groups is about 1:1. The ratio of SiVi to SiH groups may impact the adhesive properties of the gel. When a firmer, lower tack gel is desired, the ratio of SiH groups to SiVi groups may be selected to be higher then when a softer gel with higher tack is desired. When a softer, lower tack gel is desired, the ratio of SiVi groups to SiH groups may be higher. Gels suitable for use in the first portion 12 include SILPURAN® 2130, SILPURAN® 2117, SILPURAN® 2142, SilGel® 612, which are sold and manufactured by Wacker Chemie AG. Other gels suitable for use in the first portion 12 include SSA 7-9900 and 7-9950 sold by the Dow Silicones Corporation.

Preferably, the gel has a crosslinked structure. A crosslinked structure forms when the total number of functionality of reacting groups is greater than 4. Thus, for gel formed by platinum catalyzed hydrosilylation reaction, crosslinking can happen, for example, between the first polysiloxane with at least two reactive aliphatically unsaturated groups and the second polysiloxane containing more than two Si-bonded hydrogen atoms, or alternatively between a first polysiloxane with at least more than two aliphatically unsaturated radicals and a second polysiloxane containing two Si-bonded hydrogen atoms. Crosslinked gels can also be formed by condensation reactions, for example, by reaction between alkoxy or hydroxy functional siloxanes, silanes, silicone resins. A condensation catalyst such as organotin compounds may be added to facilitate the crosslinking. Other ways of crosslinking may include radiation curing such as by application of UV, gamma ray, electron beam, etc. resin. Crosslinking occurs when the mixture is cured. Preferably, the first polysiloxane and the second polysiloxane are crosslinked to the gel point of the mixture.

In some embodiments, the first portion 12 may comprise a pressure sensitive adhesive. In these embodiments, the adhesive may be selected based on its compatibility with the active compound and the ability of the active compound to flow through the adhesive. As used herein, the term "pressure-sensitive adhesive" refers to a viscoelastic material which adheres almost instantaneously to most substrates with the application of very slight pressure and remains permanently tacky. A polymer is a pressure-sensitive adhesive within the meaning of the term as used herein if it has the properties of a pressure-sensitive adhesive per se or functions as a pressure-sensitive adhesive by admixture with tackifiers, plasticizers or other additives. Examples of pressure sensitive adhesives include the gel embodiments described above. The pressure-sensitive adhesive also may include mixtures of different polymers and mixtures of polymers, such as, for example, polyisobutylenes (PIB) of different molecular weights, the resultant mixtures providing a pressure-sensitive adhesive. In embodiments where like materials of different molecular weights are utilized, the polymers of lower molecular weight in the mixture are not considered to be "tackifiers." As utilized herein, the term "tackifier" is used to describe additives that differ other than in molecular weight from the polymers to which they are added.

Suitable adhesive materials for forming the pressure sensitive adhesive include non-toxic natural and synthetic polymers known for use in transdermal or topical delivery devices. The adhesive material may be solvent-based, hot melt, or of the grafted variety. Such varieties may be used alone or in combinations, mixtures, or blends with each other. Other examples of suitable adhesive materials include acrylic polymers, gums, silicone-based polymers including silicone fluids, and rubber-based polymers that include hydrocarbon polymers such as, for example, natural and synthetic polyisoprene, polybutylene, polyisobutylene, styrene based polymers, styrene block copolymers, butadiene based polymers, styrene/butadiene polymers, styrene-isoprene-styrene block copolymers. Hydrocarbon polymers such as, for example, butyl rubber and halogen-containing polymers such as, for example, polyacrylonitrile, polytetrafluoroethylene, polyvinylchloride, polyvinylidene chloride, and polychlorodieneas polyisobutylenes are suitable adhesive materials. Other hydrocarbon polymers such as, for example, polybutylenes, ethylene/vinyl acetate and vinyl acetate based materials, styrene/butadiene materials, polyisoprenes, styrenes and styrene block copolymers and block amide copolymers are suitable for use in the first portion 12 as are bioadhesives known in the art. Adhesive materials such as, for example, polyisobutylenes, acrylates, acrylics, silicones, and combinations thereof may be preferred.

In certain embodiments, it may be preferred that the adhesive material for the pressure sensitive adhesive is a silicone-based polymer material. Suitable silicone-based polymers may include a silicone gum and a tackifying resin. Suitable silicone-based polymers for use in the first portion 12 may be prepared by cross-linking the gum, typically a high molecular weight polydiorganosiloxane, with the resin to produce a three-dimensional silicate structure via a condensation reaction in an appropriate organic solvent. In some embodiments, the ratio of resin to polymer can be adjusted in order to modify the physical properties of adhesive material. Use of capped (or amine-compatible) polysiloxanes are often preferred to increase stability and reduce degradation. An example of such a suitable silicone-based polymer adhesive material for use in the first portion 12 is sold under the trademark BIO-PSA® and is manufactured by the Dow Silicones Corporation. In other embodiments, the silicone-based polymer adhesive material may be an amine-compatible and comprise a trimethylsiloxy end-capped reaction product of a silanol endblocked polydimethylsiloxane with a silicate resin.

The first portion 12 may also comprise one or more fillers. The fillers may be of the non-reinforcing variety and the reinforcing variety. Examples of suitable fillers include, for example, quartz, diatomaceous earth, calcium silicate, zirconium silicate, zeolites, metal oxide powders, such as aluminum, titanium, iron, or zinc oxides or mixed oxides thereof, barium sulfate, calcium carbonate, gypsum, silicon nitride, silicon carbide, boron nitride, glass powder and plastics powder. Additional fillers suitable for use in the first portion 12 include pyrogenic silica, precipitated silica, aluminum hydroxide, carbon black, such as furnace black and acetylene black, and silicon-aluminum mixed oxides. The first portion 12 may also comprise one or more of the agents noted below, which may be blended with the other materials of the first portion 12 during formation thereof.

In certain embodiments (not depicted), the delivery device 10 may comprise a gel portion or a foam portion and a pressure sensitive adhesive. For example, in an embodiment, the first portion 12 may comprise a gel or a foam portion and the adhesive. In this embodiment, the adhesive portion may be provided at a perimeter of the first outer surface 14 or in another location on the device 10. The adhesive portion may be provided as a layer and have minimal or no contact with the active compound. In other embodiments, the adhesive portion may be disposed on the gel or foam. In these embodiments, the adhesive portion may also be referred to herein as an overlay adhesive layer.

As noted above, it may be desirable to use the delivery device 10 multiple times. Unfortunately, the tack exhibited by adhesive surfaces in known devices may diminish significantly after a first use because of fouling from the active(s) present, a solvent, the user's skin cells, dirt, or for another reason. Advantageously, the configuration of the first portion 12 enables the the delivery device 10 to be usable multiple times. For example, by forming the first portion as described above, the first portion 12 can wet out and conform to the contours of the user's skin during each use. Additionally, forming the first portion 12 as a gel as described above helps to prevent permanent bonding of, for example, the active(s) to the first outer surface 12, crystallization of the active(s) on the first outer surface 14, or adverse impacts to the first outer surface's tackiness in other ways. Thus, the first outer surface 14 may exhibit a tack that is sufficient to adhere the delivery device 10 to the user for one or more uses of the device 10. Another advantage of the delivery device 10 is that the tack exhibited by the first outer surface 14 is long-lasting even after an active compound is delivered thereto. It should be noted that the tack exhibited by the first outer surface 14 may vary due to, for example, the active compound being delivered. Thus, in some embodiments, the first tack may be selected such that the second tack exhibited by the first outer surface 14 is of a predetermined value.

In some embodiments, the first outer surface 14 may exhibit an initial tack, which may also be referred to herein as a first tack. The first tack can be measured, for example, before providing an active compound in the first portion 12, before providing an amount of active compound to the delivery device, or before providing another amount of active compound to the delivery device. In these embodiments, the initial tack exhibited by the first outer surface may be selected to be a predetermined value. After the active compound flows through the first portion 12 where it is delivered to the first outer surface 14, the first outer surface 14 exhibits a second tack of at least 25 percent of the first tack. In other embodiments, after delivering an active compound to the first outer surface 14, the first outer surface 14 may exhibit a second tack of at least 50 percent of the first tack. Preferably, after delivering an active compound to the first outer surface 14, the first outer surface 14 exhibits a second tack of at least 75 percent of the first tack. In some embodiments, the first outer surface 14 exhibits a second tack of at least 90 percent of the first tack. In still other embodiments, the first outer surface 14 exhibits a second tack that is equal to or greater than the first tack.

The tack exhibited by the first outer surface 14 may be greater than 50 grams of force (gf). Preferably, the tack exhibited by the first outer surface 14 is greater than 100 gf. However, the tack must not be so strong that, for example, the skin or another area of the user is damaged when the delivery device 10 is removed. Thus, in some embodiments, the tack exhibited by the first outer surface 14 is less than 800 gf. In these embodiments, the tack exhibited by the first outer surface 14 may be 50-800 gf. In some embodiments it may be preferred that the tack exhibited by the first outer surface 14 is 100-800 gf. Even more preferably, in these embodiments, the tack exhibited by the first outer surface 14 may be 200-800 gf. The tack exhibited by the first outer surface 14 can be measured by known methods. For example, when measured, the tack of the first outer surface 14 can be measured with a TA.XT Plus Texture Analyzer using a TA-57R probe and a TA-303 apparatus.

Additionally, the first outer surface 14 must exhibit a resilience that allows it to be cleaned after use if desired. Cleaning the first outer surface 14 may be conducted using commercially available cleaning devices and cleaning agents such as, for example, soap, isopropanol (IPA) or similar agents to remove buildup of sweat, moisture, oils, dirt, and other materials that are not desirable. In order to maintain the tack and desired resilience of the first outer surface 14, the first portion 12 may be configured to have a thickness of 0.1 millimeters (mm) or more. Preferably, the first portion 12 is configured to have a thickness of 0.4 mm or more. In some embodiments, the thickness of the first portion 12 is 0.5-50 mm. In other embodiments, the thickness of the first portion 12 is 1-20 mm. Preferably, the thickness of the first portion 12 is 10-20 mm.

In certain embodiments, the delivery device 10 comprises a reservoir 16. The reservoir 16 may be configured to store an amount of active compound. When the delivery device 10 is in use, the reservoir 16 may facilitate the controlled release of active compound and the delivery of active compound to the first outer surface 14 of the device 10. In the embodiments illustrated, the reservoir 16 can be filled with a liquid or solid during the manufacture of the delivery device 10, while the device 10 is being utilized, or after use of the device 10.

The reservoir 16 may abut the first portion 12 so that the reservoir 16 and the first portion 12 are in direct fluid communication. In other embodiments, the first portion 12 may act as the reservoir and utilized to store an amount of active compound until the delivery device 10 is utilized. In these embodiments, the active compound may be included in the first portion 12 during the formation of the first portion 12. In other embodiments, an active compound such as, for example, cannabinoid may be directed to the first portion 12 after formation thereof.

Figure 2:
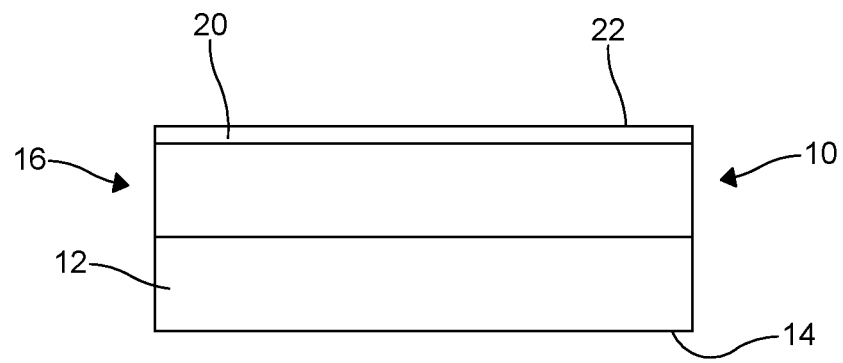
FIG. 2 is a sectional view of another embodiment of the delivery device in accordance with the invention.
Figure 3:
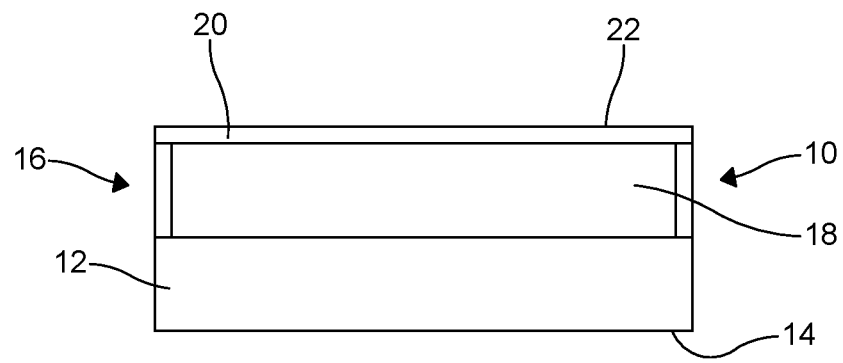
FIG. 3 is a sectional view of another embodiment of the delivery device in accordance with the invention.

Referring now to FIGS. 2-3, the reservoir 16 may be a discrete portion of, e.g. separate from the first portion 12, and provided within the delivery device 10. In this embodiment, the reservoir 16 may be configured to store a liquid solution comprising an active compound or a solid form of the active compound.

In one embodiment, like the one illustrated in FIG. 2, the reservoir 16 may be formed utilizing a foam member. In this embodiment, the foam member may comprise a plurality of cavities. The active compound can be directed to the foam member when desired and stored in the cavities until the delivery device 10 is utilized. In certain embodiments, the foam member may be utilized to assist in adhering the delivery device 10 to the skin of the user. The foam materials known in the art are suitable for use as a reservoir 16 in the delivery device 10.

In other embodiments, the reservoir 16 may be formed by an absorbing member. In these embodiments, the absorbing member may be formed from a material selected to store an amount of the active compound included in a liquid and release the liquid when the delivery device 10 is utilized. Absorbing materials known in the art are suitable for use in these embodiments.

In still other embodiments, the reservoir 16 may be formed from woven fibers as, for example, gauze or other woven materials. In these embodiments, the active compound may be stored in the reservoir 16 within the interstices between the fibers. Fiber materials known in the art are suitable for use as a reservoir 16.

In other embodiments, like the one illustrated in FIG. 3, the reservoir 16 may be a cavity 18. Although a single cavity 18 is illustrated in FIG. 3, it should be appreciated that a plurality of cavities may be provided within the delivery device 10. In these embodiments, the reservoir 16 may be configured to store a liquid including the active compound or the active compound in solid form. As illustrated, the cavity 18 may be at least partially defined by two or more portions of the delivery device. For example, the cavity 18 may be defined by a section of the first portion 12 and a backing layer 20.

Preferably, the delivery device 10 comprises a backing layer 20. The backing layer 20 may define a second outer surface 22 of the delivery device 10 and form a protective layer that prevents the cannabinoid and other portions of the device 10 from being exposed to the environment during use of the device 10. In some embodiments, the backing layer 20 may function as a reservoir.

Referring back to FIG. 1A, the backing layer 20 can be attached directly to the first portion 12. In other embodiments, like the ones shown in FIG. 2-3, the backing layer 20 may be connected to first portion 12 through another portion of the delivery device 10. For example and as illustrated in these embodiments, the backing layer 20 may be separated from the first portion 12 by the reservoir 16. It should be noted that although the backing layer 20 is illustrated as a single layer, the backing layer 20 may be multilayered and include two or more laminated layers.

Suitable materials for forming the backing layer 20 include polyester, polyethylene, vinyl acetate resins, polypropylene, ethylene-vinyl acetate copolymers, polyvinyl chloride, polyurethane, similar polymers, and polymer blends thereof, metal foils, non-woven fabric, textiles, foams, and other materials known in the art for such devices 10. In some embodiments, the backing layer 20 may be formed by a coextrusion process or lamination process. The material(s) utilized to form the backing layer 20 may be configured to provide the backing layer 20 with a thickness of 0.002-1 mm, preferably, 0.012-0.25 mm.

Figure 4:
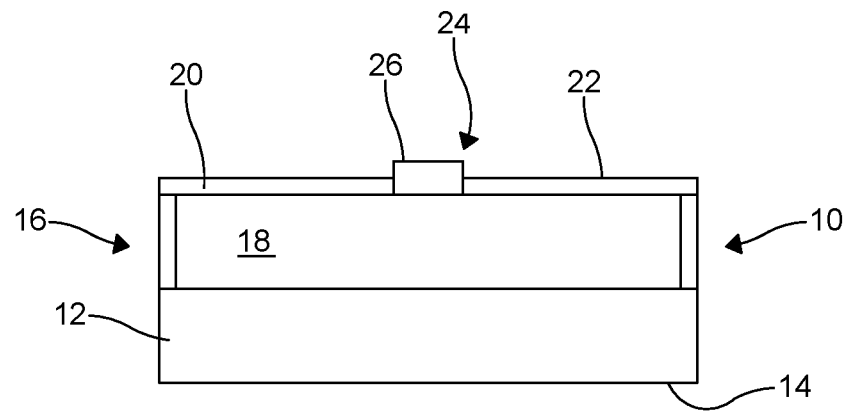
FIG. 4 is a sectional view of another embodiment of the delivery device in accordance with the invention.
Figure 5:
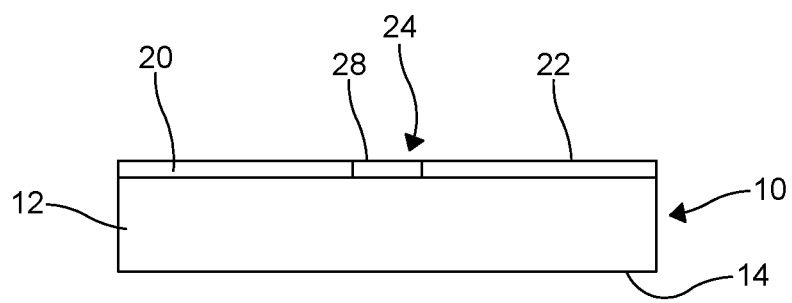
FIG. 5 is a sectional view of another embodiment of the delivery device in accordance with the invention.
Figure 6:
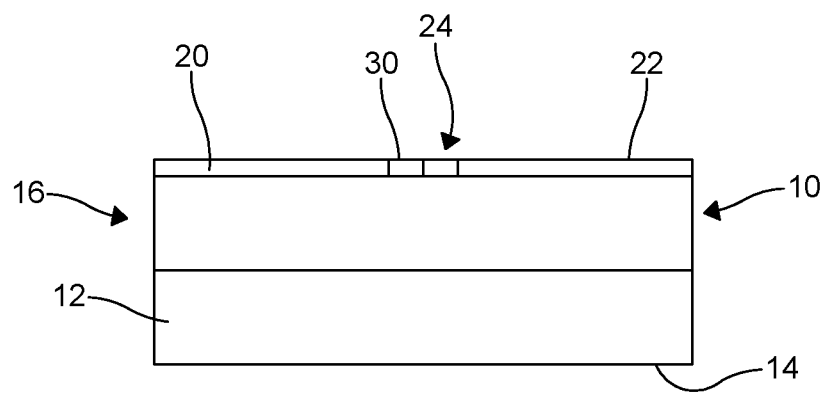
FIG. 6 is a sectional view of a further embodiment of the delivery device in accordance with the invention.

In some embodiments, the backing layer is configured to be permeable or porous such that the backing layer 20 permits the active compound to be delivered to the delivery device 10. For example, a first amount, a second amount, or another additional amount of active compound can be delivered to the delivery device 10 through the backing layer 20. Referring now to FIGS. 4-6, in other embodiments, an opening 24 is provided in the backing layer 20. In the embodiments illustrated, the opening 24 is provided through the second outer surface 22 of the delivery device 10. However, in other embodiments (not depicted), the opening 24 may be provided through another portion of the backing layer 20. For example, the opening 24 may be provided through an outer edge portion of the backing layer 20 or the delivery device 10. In still other embodiments (not depicted), the opening 24 may be provided in another member of the delivery device 10.

When provided, the opening 24 permits the active compound to be delivered to the delivery device 10. For example, a first amount, a second amount, or another additional amount of active compound can be delivered to the delivery device 10 through the opening 24. As illustrated in FIGS. 4 and 6, in some embodiments, the opening 24 is in fluid communication with the reservoir 16. In other embodiments, like the one illustrated in FIG. 5, the opening 24 may be in direct fluid communication with the first portion 12. The opening 24 may permit fluid communication between an external delivery device (not depicted), which directs an amount of, for example, cannabinoid into the opening 24, and the first portion 12. In the embodiments illustrated in FIGS. 4 and 6, an amount of active compound can be directed from the opening 24 to the first portion 12 by way of the reservoir 16. In the embodiment illustrated in FIG. 5, an amount of active compound can be directed from the opening 24 directly to the first portion 12.

In some embodiments, the opening 24 may be defined by a conduit 26 disposed in the backing layer 20. In other embodiments, the opening 24 may be defined by a void 28 in the backing layer 20. In still other embodiments, the opening 24 may be defined by a resealable port. In one such embodiment, the resealable port 30 may be a self-sealing rubber septum. External delivery devices such as, for example, syringes, hyperdermic needles, droppers, pipettes and other known devices are suitable for use with the delivery device 10.

Figure 1A:
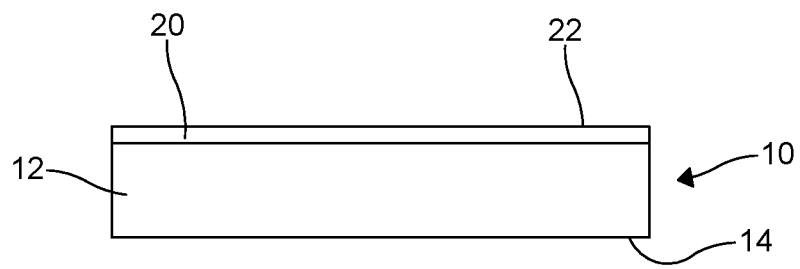
FIG. 1A is a sectional view of the delivery device of FIG. 1.

In certain embodiments, such as the embodiment illustrated in FIG. 1, the delivery device 10 comprises a release liner 32. The release liner 32 is disposed on the first outer surface 14 and may be provided there until the delivery device 10 is utilized. The release liner 32 is provided to protect the first portion 12 and, in some embodiments, can be reused after adding an amount of active compound and before reuse of the device 10.

Materials known in the art are suitable for use in the release liner 32 and commercially available release liners such as Syl-off® 7610 sold by DOW Chemical Company may be suitable for use in the delivery device 10. Another example of a suitable releaser liner is 1022 ScotchPak® which is manufactured by the 3M Company. Alternatively, the first portion 12 can be protected by storing the delivery device 10 in a protective container (not depicted).

When desired, the delivery device 10 can be utilized with one or more active delivery systems and techniques. Suitable active delivery systems and techniques for use in the method include ultrasonic systems, electrically assisted systems, velocity-based devices such as powder injection and jet injectors, thermal devices such as lasers and radio-frequency heating devices, and mechanical devices and techniques such as microneedles and tape striping.

In embodiments where the delivery device 10 is configured to receive one or more amounts of an active compound, a first amount of the active compound may be provided to the delivery device. The first amount of the active compound can be included in the device 10 before receipt of the device 10 by a retailer or the user. For example, a first amount of cannabinoid can be provided in the first portion 12 during the manufacture of the delivery device 10. In other embodiments, the delivery device 10 can be provided to a retailer or the user without any active compound(s) included therein.

In these embodiments, the user, for example, may provide the first amount of active compound to the delivery device 10.

In certain embodiments, a second amount or an additional amount of the active compound may be provided to the delivery device 10. The second amount or another additional amount of the active compound may be provided to the delivery device 10 in various ways. In some embodiments, the additional amount of active compound may be added to the delivery device 10 using one of the external delivery devices noted above. In other embodiments, the additional amount of the active compound can be delivered to the first outer surface 14 of the device 10 and kept in contact with the first outer surface 14 for a time sufficient to allow the active compound to flow into the device 10 by way of the first portion 12. For example, an amount of cannabinoid, preferably in a carrier, may be applied on the first outer surface 14 and allowed to flow into the first portion 12 before the device 10 is utilized.

In embodiments where the delivery device 10 is configured to receive one or more amounts of active compound, it may be desirable that the active compound is delivered in a carrier. Preferably, the carrier is a liquid that promotes the absorption of the active compound in the first portion 12 and controlled release of the active compound from the device 10. In one embodiment, the carrier is selected to cause the first portion 12 to swell, which may increase the penetration and flow of the active compound in and through the first portion 12. Suitable carriers include alcohols such as, for example, isopropanol.

Additional additives can be provided in the first portion 12 such as, for example, skin conditioners, moisturizers, and surfactants. Exemplary conditioners include mineral oil, petrolatum, vegetable oils (such as soybean or maleated soybean oil), dimethicone, dimethicone copolyol, cationic monomers and polymers (such as guar hydroxypropyl trimonium chloride and distearyl dimethyl ammonium chloride) as well as combinations thereof. Illustrative moisturizers include polyols such as sorbitol, glycerin, propylene glycol, ethylene glycol, polyethylene glycol, polypropylene glycol, 1,3-butane diol, hexylene glycol, isoprene glycol, xylitol, fructose and mixtures thereof. Examples of surfactants suitable for use include those that are anionic, cationic, nonionic, amphoteric, zwitterionic and combinations thereof. Most preferred are nonionic and amphoteric surfactants due to their mildness. Examples of suitable amphoteric surfactants are cocoamidopropylbetaine and lauroamphoacetate. Examples of suitable nonionic surfactants are dialkylamine oxides, alkyl polyglycosides and methyl glucamides. Examples of mild anionic surfactants include salts of sarcosinate, taurate and cocoyl isethionate. Other surfactants suitable for use are sucrose distearate, diglyceryldistearate, tetraglyceryl tristearate, decaglyceryl decastearate, diglyceryl monostearate, hexaglyceyl tristearate, decaglyceryl pentastearate, sorbitan monostearate, sorbitan tristearate, diethylene glycol monostearate, the ester of glycerol and of palmitic acid and stearic acid, monostearate polyoxyethylenated with 2 OE (containing 2 oxyethylene units), glyceryl mono- and dibehenate and pentaerythrityl tetrastearate.

Once an amount of active compound is provided to and received by the delivery device 10, the device 10 may be ready for use. However, the rate that the active compound is received by the delivery device 10 may vary between embodiments and/or be based on the compound being delivered to the device 10. In use, the delivery device 10 is applied to the skin of the user after removing the release liner 32, when provided. Preferably, the device 10 is in direct contact with the skin of the user. Upon application of the device 10, the active compound provided in the first portion 12 can flow through the first portion 12 to the first outer surface 14 of the device 10 where it is delivered to, for example, the skin or another portion of the user. Advantageously, after delivering the active compound to the first outer surface 14, the first outer surface 14 exhibits a tack that enables it to be removed from the user when desired and reapplied when desired. As noted above, the active compound is delivered to the first outer surface 14 after flowing through the first portion 12. In some embodiments, a portion of a first amount of active compound flows through the first portion 12. After the active compound flows through the first portion 12, a second amount or another additional amount of active compound may be introduced into the first portion 12. The second amount of active compound is introduced into the first portion 12, after being provided to and received by the delivery device 10.

Each additional amount of active compound may flow through the first portion 12 and be delivered to the first outer surface 14 of the delivery device 10. However, it should be appreciated that the rate that the active compound flows through the first portion 12 may depend on the compound. After adding one or more additional amounts of active compound, the delivery device 10 is ready for use. After a desired amount of time or active compound delivery, the delivery device 10 can be removed from the skin of the user. After each use, the first outer surface 14 can be cleaned as desired using a cleaning agent, such as, soap, isopropanol, or other similar cleaners to remove buildup of sweat, moisture, or excess oil. After such a cleaning, the first outer surface 14 may be allowed to dry for a predetermined period of time.

EXAMPLES

The following examples are presented solely for the purpose of further illustrating and disclosing the embodiments of the method and delivery device. Examples within the scope of the invention are EXAMPLES 1-3 and EXAMPLES 6-11. Comparative examples, which are EXAMPLES 4-5, are provided to illustrate the advantages of certain embodiments and are not within the scope of the invention.

The examples provided below that refer to the release of cannabinoid were conducted using a Franz diffusion cell (Franz cell) through a disc of cellulose acetate membrane or an artificial skin Strat-M membrane. The Franz cells described in the examples were DHC-6AT Dry Heat Transdermal Diffusion Cell Transdermal Systems sold by the Logan Instruments Corp.

When a porous cellulose acetate membrane was utilized, the cellulose acetate membrane had a molecular weight cut-off of 12-14. Before use in the studies, each cellulose acetate membrane was soaked in pH 7.4 phosphate buffer solution overnight to remove any non-bound chemicals. Strat-M artificial skin membranes were purchased from Millipore Sigma.

In order to study the release of the active compounds referred to in EXAMPLES 1-3 and EXAMPLES 6-11, gel samples were formed and cut into 1×1 $cm^2$ portions or die-cut into portions having a circular shape and a 1 cm diameter. These portions were mounted on a cellulose acetate membrane or a Strat-M membrane and the release of cannabinoid was measured. In these examples, a 20% EtOH-in-water solution was used as the receptor cell fluid unless otherwise specified. The receptor cell temperature of the Franz cell was set to 37° C. while having the solution stirred at a constant rate of approximately 600 rpm. Samples of the solution were taken at various time points over the studies. Each time after collecting a solution sample, an aliquot of 0.35 mL or the entire receptor cell fluid of 11.2 mL was removed and replaced with a fresh amount of the same fluid. In EXAMPLES 1-3 and EXAMPLES 6-11, the cannabinoid utilized was cannabidiol (CBD) and CBD concentrations in the collected samples were determined by high pressure liquid chromatography.

In EXAMPLES 1-3 and EXAMPLES 6-11, tack was measured on films having a thickness of 15 mil or 381 micron. To measure the tack, a TA.XT plus Texture Analyzer with a TA-57R probe and a TA-303 apparatus for consistent placement of the tested substrate was used. The peak tack is reported for each sample in EXAMPLES 1-3 and EXAMPLES 6-11 and expressed in grams of force (gf), which results from the probe head contacting the surface of the sample and then pulling away and off the sample. For each example, five samples were taken and tested. The final peak tack value is the arithmetic mean from the corresponding five peak tack results unless otherwise noted.

Also, below, the term "reloadable cycle" may be utilized and refers to the use of a sample for a specified amount of time followed by the addition of an additional amount of active compound to the sample.

Example 1

The controlled release of CBD, reported as the cumulative flux Q ($\mu$g/cm$^2$) against the inverse of time (min$^{1/2}$), from a gel sample was studied in this example by adding an additional amount of CBD to the gel after an initial release of CBD. The gel was prepared by mixing 46.2 wt % of a A Component, 46.2 wt % of a B Component, both components having a composition consistent with those utilized to form SILPURAN® 2130, and 7.6 wt % CBD isolate. The CBD isolate was provided as a CBD powder having a 99+% purity and was purchased from Kazmira LLC.

Figure 7:
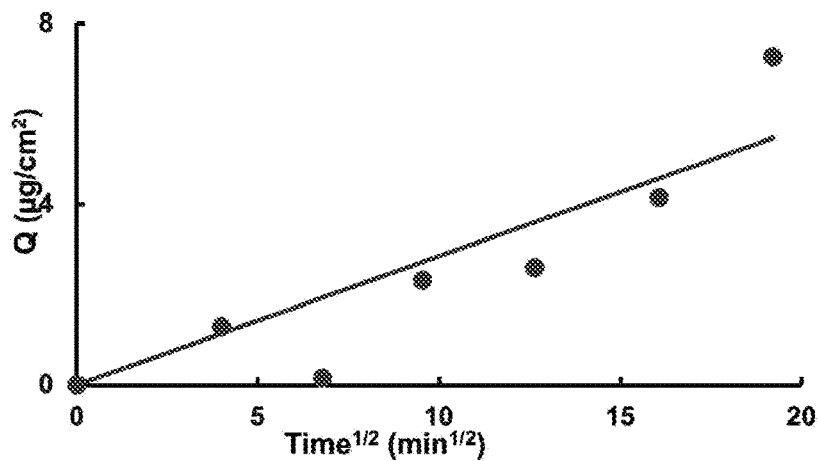
FIG. 7 is a graph illustrating the release profile of an embodiment in accordance with the invention.

A film of the mixture having a thickness of 381 microns was drawn on a MYLAR™ sheet with a film applicator and cured in an oven at 125° C. for 15 min. After curing, a square sample of the gel of 1 cm$^2$ was formed. The tack was measured and the sample exhibited a tack of 496 gf. After measuring the tack, the sample was mounted on a Franz cell. The release of CBD from the sample was measured for 6 h. After the release, the tack exhibited by the sample was measured. The tack exhibited by the sample was 290 gf after release. The release profile is shown in FIG. 7. As illustrated in FIG. 7, the amount of CBD released from the gel was 7.3 $\mu$g/cm$^2$.

After 22 hours the sample was removed from the cell and dried for 30 minutes under vacuum. A solution (10 $\mu$L) of CBD powder isolate (0.231 g/mL in isopropanol) was added to the surface of the sample with a dropper. The sample was dried at room temperature for 15 minutes followed by 30 minutes in a vacuum oven. After drying, the tack was measured and the sample exhibited a tack of 29 gf. After measuring the tack, the sample was placed on the Franz cell again to measure the release after the additional amount of CBD was added as described above.

Figure 8:
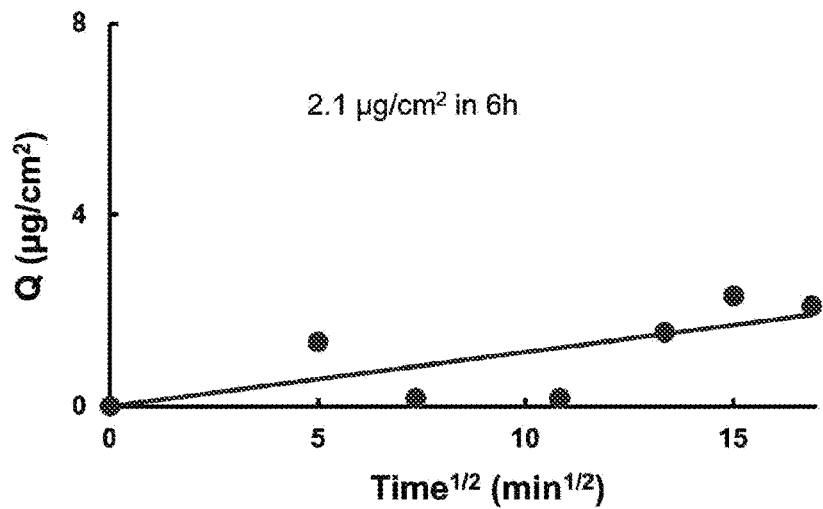
FIG. 8 is a graph illustrating the release profile of an embodiment in accordance with the invention.

A release profile after adding the additional amount of CBD to the sample is illustrated in FIG. 8. As illustrated, the amount of CBD released after 6 hours was 2.1 $\mu$g/cm$^2$. After the release, the tack exhibited by the sample was measured. The tack exhibited by the sample was 136 gf.

As shown, in Example 1, a controlled release of CBD is obtained after adding additional CBD to the sample, but there is a significant reduction in tack. It is believed that the reduction in tack is due to the crystallization of the CBD on the surface of the sample when the lipophilic CBD is exposed to an aqueous environment during the release of CBD and residual CBD from the addition procedure. It is also believed that the release rates described for Example 1 can be modified by choice of excipient or permeation agent.

Example 2

The controlled release of CBD, reported as the cumulative flux Q ($\mu$g/cm$^2$) against the inverse of time (min$^{1/2}$), from a gel sample was studied in this example by adding CBD to the gel. The gel was prepared by mixing a A Component with a B Component, both components having a composition consistent with those utilized to form SILPURAN® 2117. The tack exhibited by the gel was 504 gf. After forming the gel, CBD-containing hemp plant extract known as Imperial Oil and purchased from Kazmira LLC was added to the gel to form the sample. After forming the sample, the tack exhibited by the sample was measured at 529 gf.

To add CBD to the gel, the CBD-containing extract was diluted with isopropanol to obtain a 0.53 g/mL solution. 10 $\mu$L of the solution was applied with a micropipette to the gel, which had a 15 mil thickness. The gel and solution were kept in contact for a predetermined period of time to allow the CBD solution to penetrate into the gel. After the predetermined period of time, the excess CBD solution on the surface of the sample was cleaned off using soap and water. Next, the sample was dried for 20 minutes under vacuum at 37° C. and a pressure of −0.987 bar.

Figure 9:
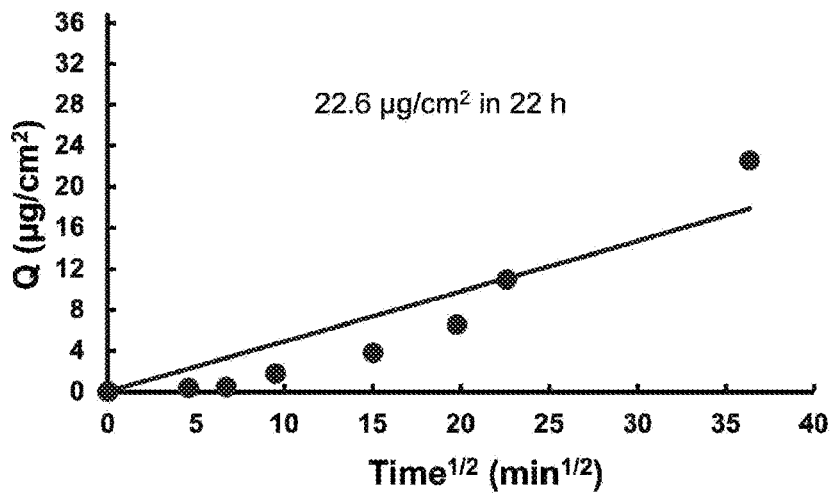
FIG. 9 is a graph illustrating the release profile of an embodiment in accordance with the invention.

To measure the release of CBD from the sample, the sample was mounted on a Franz cell. The release of CBD from the sample was measured at 22.6 $\mu$g/cm$^2$ after 22 h. After releasing CBD, the tack exhibited by the sample was measured at 242 gf. The release profile shown in FIG. 9 indicates controlled release of CBD from the gel as evident with the linear relationship between the flux and inverse of time.

Example 3

The controlled release of CBD, reported as the cumulative flux Q ($\mu$g/cm$^2$) against the inverse of time (min$^{1/2}$), from a gel sample was studied in this example by adding CBD to the gel. The gel was prepared by mixing a A Component with a B Component, both components having a composition consistent with those utilized to form SILPURAN® 2117. The tack exhibited by the gel was 504 gf. After forming the gel, CBD solution was added to the gel to form the sample. After forming the sample, the tack exhibited by the sample was measured at 251 gf.

The CBD solution contained 67.41 wt % CBD isolate, 9.88 wt % propylene glycol, and 22.71% IPA. 10 $\mu$L of the solution was applied with a micropipette to the gel, which had a 15 mil thickness. The gel and solution were kept in contact for a predetermined period of time to allow the CBD solution to penetrate into the gel. After the predetermined period of time, the excess CBD solution on the surface of the sample was cleaned off using soap and water. Next, the sample was dried for 20 minutes under vacuum at 37° C. and a pressure of −0.987 bar.

Figure 10:
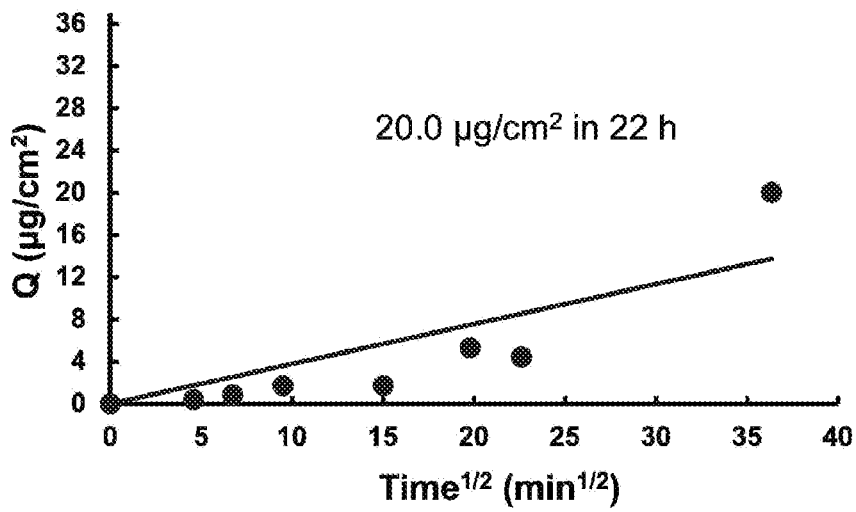
FIG. 10 is a graph illustrating the release profile of an embodiment in accordance with the invention.

To measure the release of CBD from the sample, the sample was mounted on a Franz cell. The release of CBD from the sample was measured at 20.0 g/cm$^2$ after 22 h. After releasing CBD, the tack exhibited by the sample was measured at 562 gf. The release profile shown in FIG. 10 indicates controlled release of CBD from the gel as evident with the linear relationship between the flux and inverse of time.

Example 4

A commercially available transdermal delivery device from Mary's Nutritional was provided. The device comprised CBD and an outer adhesive portion. The tack exhibited by the adhesive portion was measured. The tack exhibited by the adhesive portion was 473 gf. The CBD provided with the device was removed by soaking and agitating the device in isopropanol for 6 hours. The device was removed from the extract solution and dried in a vacuum oven at 37° C. and a pressure of −0.987 bar for 20 minutes. The adhesive portion exhibited a tack of 432 gf after removal of the CBD. A solution of CBD isolate in propylene glycol was then added to the device. The CBD solution comprised 67.75 wt % CBD isolate, 9.26 wt % propylene glycol, and 22.99% IPA. The solution was added to the device by applying it with a micropipette on a surface of the adhesive portion to attain 7.6% CBD content relative to the device weight. The solution was allowed to contact the adhesive surface for a predetermined period of time so that the CBD could penetrate the adhesive portion. After addition of the CBD solution, the tack exhibited by the adhesive portion was measured again. The tack exhibited by the adhesive portion was measured to be 0 gf.

After the predetermined period of time, the excess solution on the adhesive surface was cleaned with soap and water. Next, the device was dried for 20 minutes under vacuum at 37° C. and at a pressure of −0.987 bar.

Figure 11:
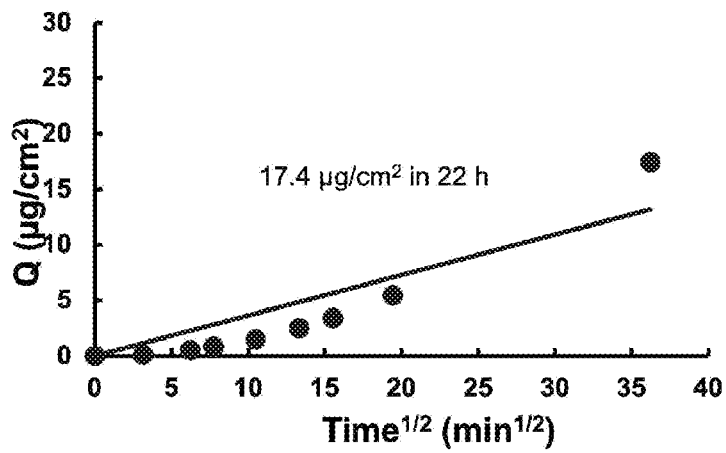
FIG. 11 is a graph illustrating the release profile of a comparative example.

To measure the release of CBD from the device, the device was mounted on a Franz cell. The release of CBD from the device was measured at 17.4 μg/cm$^2$ after 22 h. After releasing CBD, the tack exhibited by the device was measured at 99 gf. The release profile shown in FIG. 11 indicates controlled release of CBD from the device as evident with the linear relationship of the cumulative flux and inverse of time.

Example 5

A commercially available transdermal delivery device from Mary's Nutritional was provided. The device comprised CBD and an outer adhesive portion. The tack exhibited by the adhesive portion was measured. The tack exhibited by the adhesive portion was 473 gf. The CBD provided with the device was removed by soaking and agitating the device in isopropanol for 6 hours. The device was removed from the extract solution and dried in a vacuum oven at 37° C. and a pressure of −0.987 bar for 20 minutes. The adhesive portion exhibited a tack of 432 gf after removal of the CBD. A solution of Imperial Oil was diluted with isopropanol to obtain a 0.53 g/mL solution. 10 μL of the solution was applied with a micropipette to the gel, which had a 15 mil thickness. The solution was added to the device by applying it with a micropipette on a surface of the adhesive portion to attain 7.6% CBD content relative to the device weight. The solution was allowed to contact the adhesive surface for a predetermined period of time so that the CBD could penetrate the adhesive portion. After addition of the CBD solution, the tack exhibited by the adhesive portion was measured again. The tack exhibited by the adhesive portion was measured to be 0 gf. After the predetermined period of time, the excess solution on the adhesive surface was cleaned with soap and water. Next, the device was dried for 20 minutes under vacuum at 37° C. and at a pressure of −0.987 bar.

Figure 12:
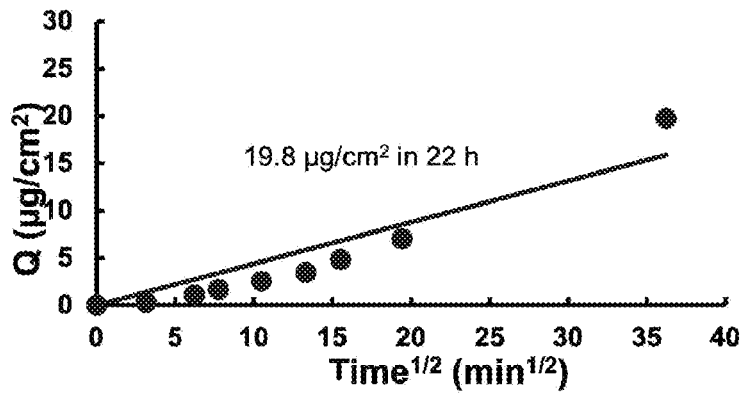
FIG. 12 is a graph illustrating the release profile of a comparative example.

To measure the release of CBD from the device, the device was mounted on a Franz cell. The release of CBD from the device was measured at 19.8 μg/cm$^2$ after 22 h. After releasing CBD, the tack exhibited by the adhesive portion was measured at 420 gf. The release profile shown in FIG. 12 indicates controlled release of CBD from the device as evident with the linear relationship of the cumulative flux and inverse of time.

Example 6

The controlled release of CBD, reported as the cumulative flux Q (μg/cm$^2$) against the inverse of time (min$^{1/2}$), from a gel sample was studied in this example by adding CBD to the gel. The gel was prepared by mixing a A Component with a B Component, both components having a composition consistent with those utilized to form SILPURAN® 2117. The tack exhibited by the gel was 588 gf. After forming the gel, Imperial Oil was added to the gel to form the sample. After forming the sample, the tack exhibited by the sample was measured at 519 gf.

To add CBD to the gel, the CBD-containing extract was diluted with isopropanol to obtain a 0.22 g/mL solution. 10 μL of the solution containing 2.2 mg of CBD was applied with a micropipette to the gel, which had a surface area of 0.79 cm$^2$ and a 15 mil thickness. The gel and solution were kept in contact for 48 hours to allow the CBD solution to penetrate into the gel. After 48 hours, the excess CBD solution on the surface of the sample was cleaned off using a tissue and isopropanol.

Figure 13A:
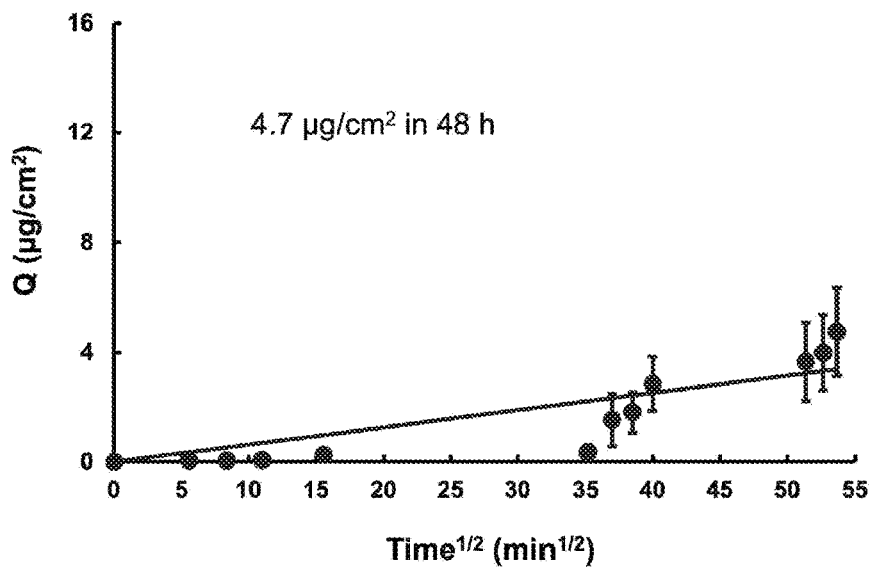
FIG. 13A is a graph illustrating a first release profile of an embodiment in accordance with the invention.

To measure the first release of CBD from the sample, the sample was mounted on a Franz cell. As illustrated in FIG. 13A, the release of CBD from the sample was measured at 4.7 μg/cm$^2$ after 48 hours. After the first release of CBD, the tack exhibited by the sample was measured at 398 gf.

Figure 13B:
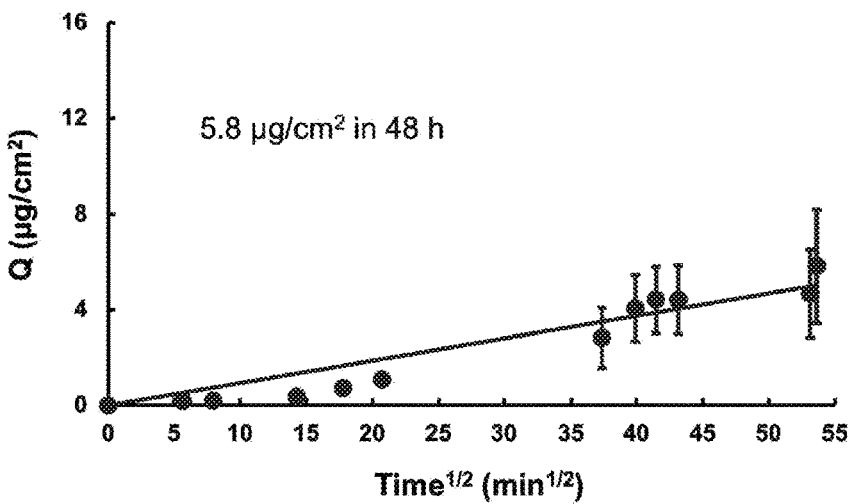
FIG. 13B is a graph illustrating a second release profile of an embodiment in accordance with the invention.

A second release of CBD from the sample was accomplished by removing the sample from the Franz cell and adding a second amount CBD to the sample as described above prior to the first release of CBD. As illustrated in FIG. 13B, the second release of CBD from the sample was measured at 5.8 μg/cm$^2$ after 48 hours.

Figure 13C:
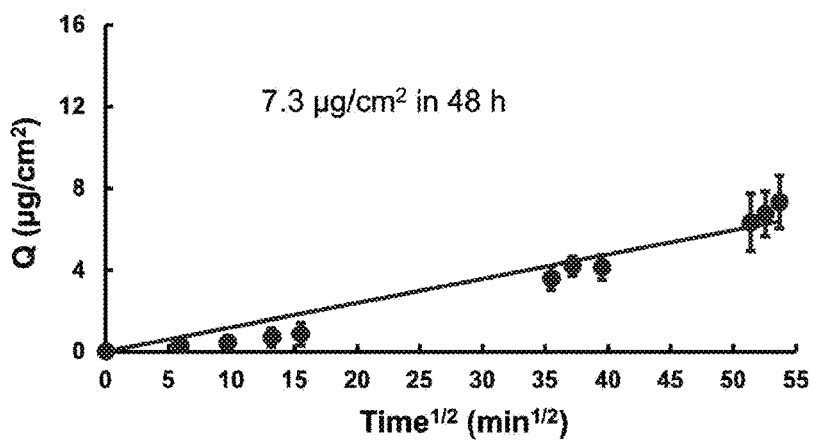
FIG. 13C is a graph illustrating a third release profile of an embodiment in accordance with the invention.

A third release of CBD from the sample was accomplished by removing the sample from the Franz cell and adding an additional amount CBD to the sample as described above prior to the first release of CBD. After adding the third amount of CBD to the sample, the tack exhibited by the sample was measured at 300 gf. As illustrated in FIG. 13C, the third release of CBD from the sample was measured at 7.3 μg/cm$^2$ after 48 hours. After the third release of CBD, the tack exhibited by the sample was measured at 330 gf.

The release profiles shown in FIGS. 13A-13C indicate controlled release of CBD as evident with the linear relationship between the release with inverse of time.

Example 7

An embodiment of a transdermal delivery device can be formed by attaching the gel described in EXAMPLE 6 to a release liner on one side and a backing layer 20 on an opposite side of the gel. After removing the release liner, a solution of CBD can be applied with a dropper to cover the exposed surface of the gel. The device may be allowed to rest for 4 hours at room temperature with the exposed surface of the gel facing upward to allow the CBD solution to penetrate the material. After four hours, excess CBD solution is removed with an alcohol wipe. The device is applied on the skin of the user until it adheres. The device remains in contact with the skin for 24 hours. After this period, the device may be removed from the skin so that additional amounts of CBD solution can be applied to the device. Three or more additional amounts of CBD solution can be applied to the device.

Example 8

Figure 14:
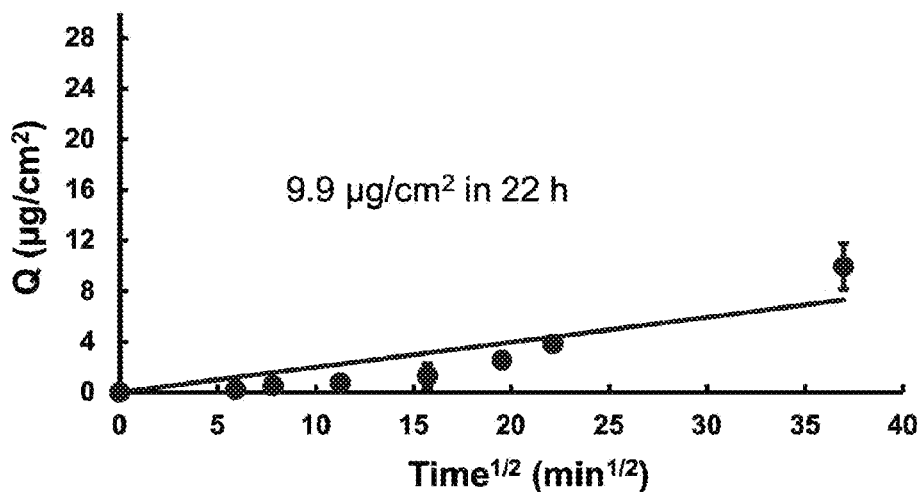
FIG. 14 is a graph illustrating a release profile of an embodiment in accordance with the invention.

A transdermal delivery device having a reservoir 16 was provided. The transdermal delivery device also included a first portion 12 comprising SILPURAN® 2117, which was used both as a rate controlling membrane and to adhere the device to the Franz cell. A solution of Imperial Oil was delivered to the reservoir 16. The controlled release of CBD, reported as the cumulative flux Q ($\mu g/cm^2$) against the inverse of time ($min^{1/2}$), from the device is illustrated in FIG. 14. As illustrated in FIG. 14, the release of CBD from the device was measured at 9.9 $\mu g/cm^2$ after 22 hours. The release profiles shown in FIG. 14 indicates the controlled release of CBD as evident with the linear relationship between the release with inverse of time.

Example 9

Figure 15:
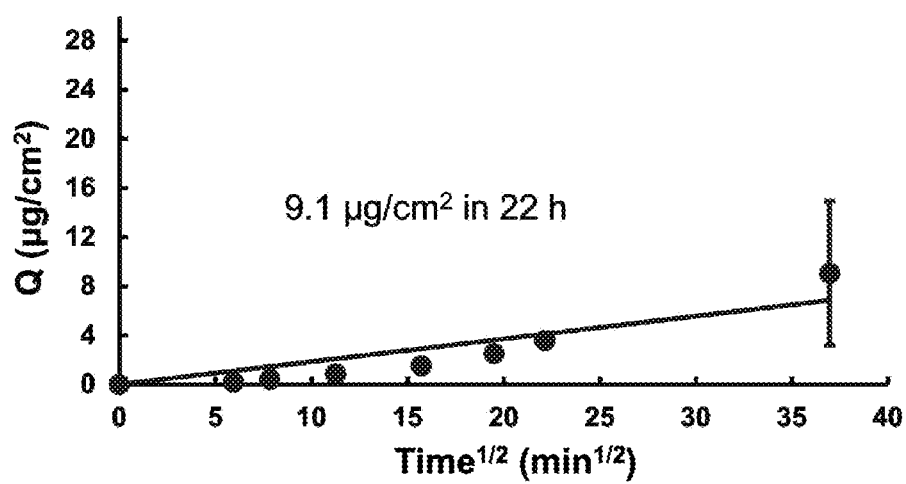
FIG. 15 is a graph illustrating a release profile of an embodiment in accordance with the invention.

A transdermal delivery device having a reservoir 16 was provided. The transdermal delivery device also included a first portion 12 comprising SILPURAN® 2117, which was used both as a rate controlling membrane and to adhere the device to the Franz cell. A solution of CBD dissolved in propylene glycol was delivered to the reservoir 16. The controlled release of CBD, reported as the cumulative flux Q ($\mu g/cm^2$) against the inverse of time ($min^{1/2}$), from the device is illustrated in FIG. 15. As illustrated in FIG. 15, the release of CBD from the device was measured at 9.1 $\mu g/cm^2$ after 22 hours. The release profiles shown in FIG. 15 indicates the controlled release of CBD as evident with the linear relationship between the release with inverse of time.

Example 10

The controlled release of melatonin, reported as the cumulative flux Q ($\mu g/cm^2$) against the inverse of time ($min^{1/2}$), from a gel sample was studied in this example by adding melatonin to the gel. The gel was prepared by mixing a A Component with a B Component, both components having a composition consistent with those utilized to form SILPURAN® 2117. The tack exhibited by the gel was 436 gf. After forming the gel, melatonin was added to the gel to form the sample. After forming the sample, the tack exhibited by the sample was measured at 298 gf.

To add melatonin to the gel, the melatonin was diluted with isopropanol to obtain a 0.02 g/mL solution. 35 µL of the solution containing 0.7 mg of melatonin was applied with a micropipette to the gel, which had a surface area of 1.77 $cm^2$ and a 15 mil thickness. The gel and solution were kept in contact for 1 hour to allow the melatonin solution to penetrate into the gel. After 1 hour, the remaining melatonin solution on the surface of the sample was removed using a tissue and isopropanol.

Figure 16A:
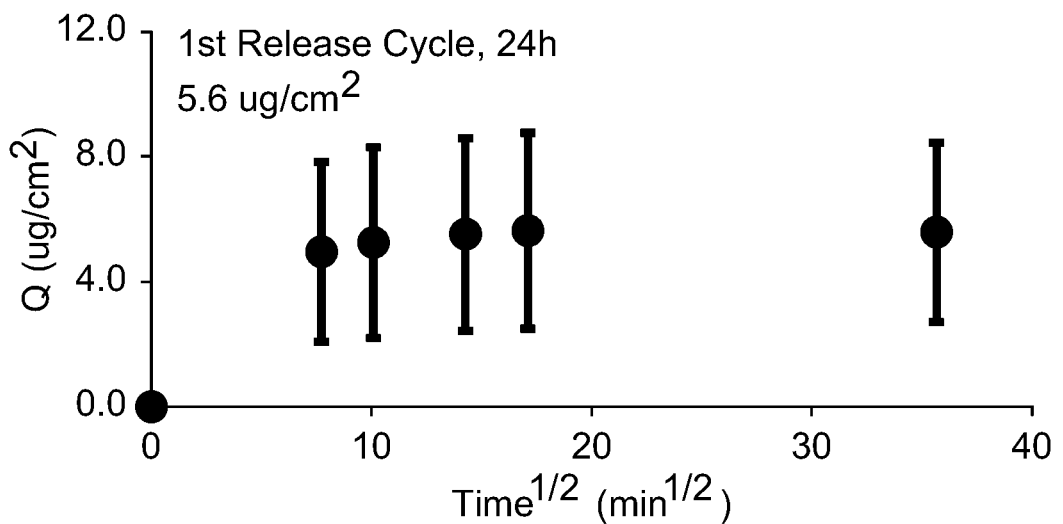
FIG. 16A is a graph illustrating a first release profile of an embodiment in accordance with the invention.

To measure the first release of melatonin from the sample, the sample was mounted on a Franz cell. As illustrated in FIG. 16A, the release of melatonin from the sample was measured at 5.6 $\mu g/cm^2$ after 24 hours. After the first release of melatonin, the tack exhibited by the sample was measured at 297 gf.

Figure 16B:
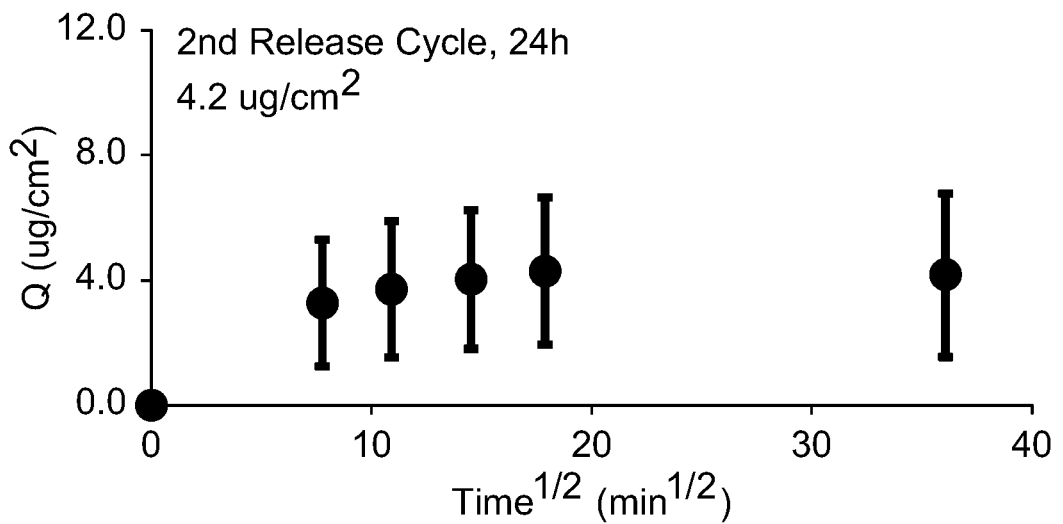
FIG. 16B is a graph illustrating a second release profile of an embodiment in accordance with the invention.

A second release of melatonin from the sample was accomplished by removing the sample from the Franz cell and adding a second amount melatonin to the sample as described above prior to the first release of melatonin. As illustrated in FIG. 16B, the second release of melatonin from the sample was measured at 4.2 $\mu g/cm^2$ after 24 hours.

Figure 16C:
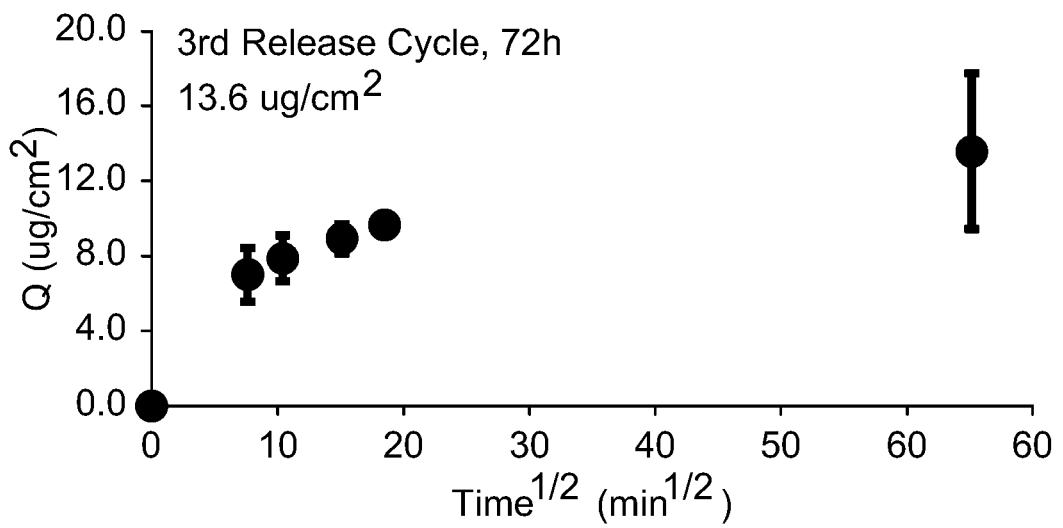
FIG. 16C is a graph illustrating a third release profile of an embodiment in accordance with the invention.

A third release of melatonin from the sample was accomplished by removing the sample from the Franz cell and adding an additional amount melatonin to the sample as described above prior to the first release of melatonin. After adding the third amount of melatonin to the sample, the tack exhibited by the sample was measured at 371 gf. As illustrated in FIG. 16C, the third release of melatonin from the sample was measured at 13.6 $\mu g/cm^2$ after 72 hours. After the third release of melatonin, the tack exhibited by the sample was measured at 381 gf.

The release profiles shown in FIGS. 16A-16C indicate controlled release of melatonin as evident with the positive correlation between the release with inverse of time.

Example 11

The controlled release of niacinamide, reported as the cumulative flux Q ($\mu g/cm^2$) against the inverse of time ($min^{1/2}$), from a gel sample was studied in this example by adding niacinamide to the gel. The gel was prepared by mixing a A Component with a B Component, both components having a composition consistent with those utilized to form SILPURAN® 2117. The tack exhibited by the gel was 436 gf. After forming the gel, niacinamide was added to the gel to form the sample. After forming the sample, the tack exhibited by the sample was measured at 411 gf.

To add niacinamide to the gel, the niacinamide was diluted with 20% water in isopropanol to obtain a 0.08 g/mL solution. 30 µL of the solution containing 2.4 mg of niacinamide was applied with a micropipette to the gel, which had a surface area of 1.77 $cm^2$ and a 15 mil thickness. The gel and solution were kept in contact for 1 hour to allow the niacinamide solution to penetrate into the gel. After 1 hour, the remaining niacinamide solution on the surface of the sample was removed using a tissue and isopropanol.

Figure 17A:
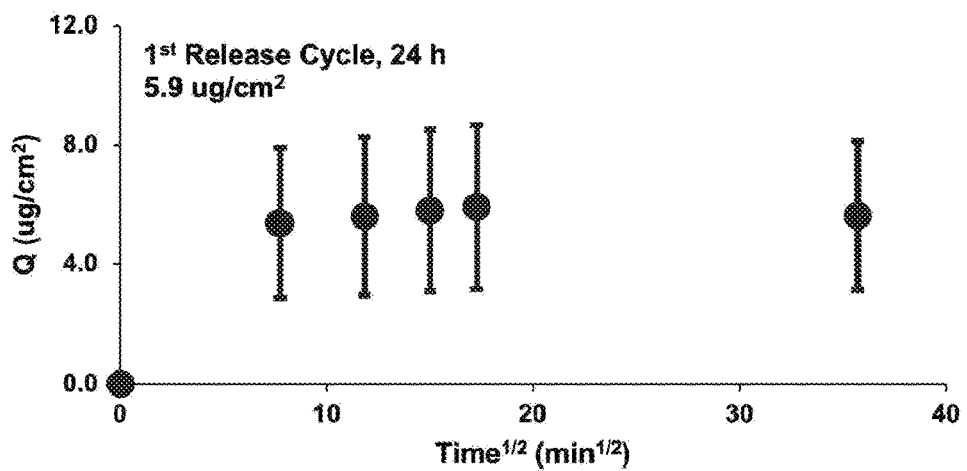
FIG. 17A is a graph illustrating a first release profile of an embodiment in accordance with the invention.

To measure the first release of niacinamide from the sample, the sample was mounted on a Franz cell. As illustrated in FIG. 17A, the release of niacinamide from the sample was measured at 5.9 $g/cm^2$ after 24 hours. After the first release of niacinamide, the tack exhibited by the sample was measured at 365 gf.

Figure 17B:
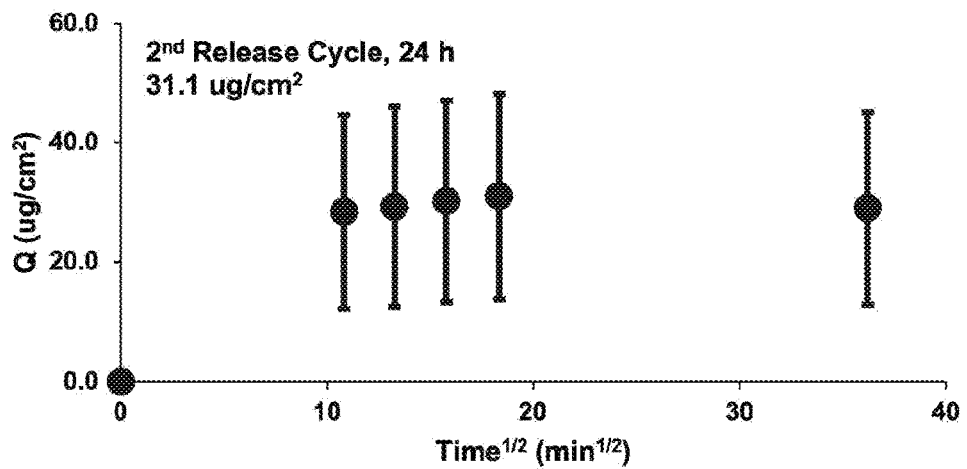
FIG. 17B is a graph illustrating a second release profile of an embodiment in accordance with the invention.

A second release of niacinamide from the sample was accomplished by removing the sample from the Franz cell and adding a second amount niacinamide to the sample as described above prior to the first release of niacinamide. As illustrated in FIG. 17B, the second release of niacinamide from the sample was measured at 31.1 $\mu g/cm^2$ after 24 hours.

Figure 17C:
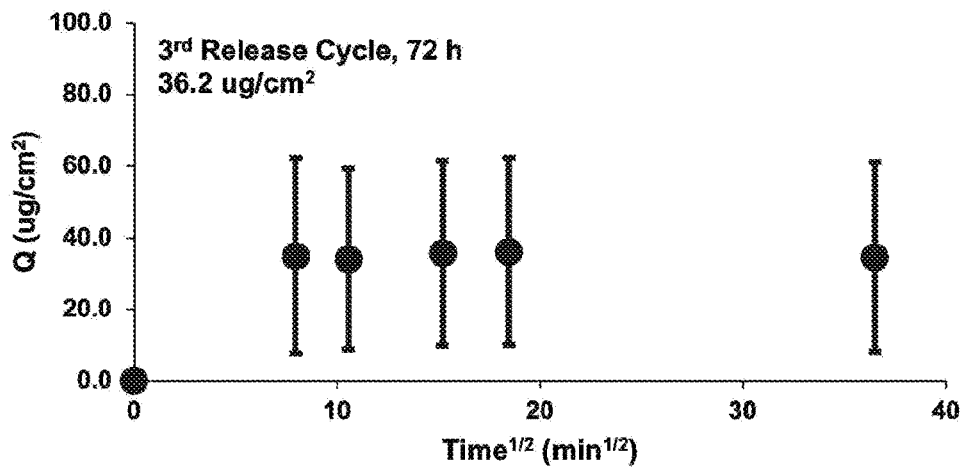
FIG. 17C is a graph illustrating a third release profile of an embodiment in accordance with the invention.

A third release of niacinamide from the sample was accomplished by removing the sample from the Franz cell and adding an additional amount niacinamide to the sample as described above prior to the first release of niacinamide. After adding the third amount of niacinamide to the sample, the tack exhibited by the sample was measured at 382 gf. As illustrated in FIG. 17C, the third release of niacinamide from the sample was measured at 36.2 $\mu g/cm^2$ after 24 hours. After the third release of niacinamide, the tack exhibited by the sample was measured at 348 gf.

The release profiles shown in FIGS. 17A-17C indicate controlled release of niacinamide as evident with the positive correlation between the release with inverse of time.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A method of delivering an active compound, comprising:
   providing a delivery device for delivery of an active compound to skin having a first portion defining first outer surface of the device being skin facing surface, the first portion being a siloxane gel and defining a first outer surface of the device, the first outer surface being configured to contact the skin and deliver the active compound thereto, wherein the siloxane gel is formed from a mixture comprising a first polysiloxane, a second polysiloxane, and a hydrosilylation catalyst, the first polysiloxane being an alkenyl-substituted polysiloxane and the second polysiloxane comprising silicon-bonded hydrogen atoms, and wherein the active compound is chosen from the group consisting of a cannabinoid and melatonin; and
   forming the first portion by providing the active compound in the first portion and, with the active compound within the first portion, curing the first portion to form the siloxane gel, wherein the first outer surface exhibits a first tack after providing the active compound and a second tack of at least 25 percent the first tack after delivering the active compound to the first outer surface.

2. The method of claim 1, wherein the second tack is at least 50 percent the first tack after delivering the active compound to the first outer surface.

3. The method of claim 1, wherein the second tack is at least 50 percent the first tack.

4. The method of claim 1, wherein the delivery device further comprises a backing layer, the backing layer defining a second outer surface of the delivery device and being attached directly to the first portion.

5. The method of claim 1, wherein the delivery device is a transdermal delivery device and the method further comprises delivering the active compound to the skin and bloodstream of a user of the delivery device.

6. The method of claim 1, further comprising forming the first portion from a mixture comprising a first polysiloxane, a second polysiloxane, and a hydrosilylation catalyst, the first polysiloxane being an alkenyl-substituted polysiloxane comprising one or more silicon-bonded vinyl (SiVi) groups and the second polysiloxane comprising one or more silicon-bonded hydrogen (SiH) groups and the ratio of SiVi:SiH groups is 10:1 to 1:10.

7. The method of claim 1, wherein the active compound is a cannabinoid.

8. The method of claim 6, wherein the ratio of SiVi:SiH groups is about 1:1.

* * * * *